(12) United States Patent
Chan

(10) Patent No.: US 7,967,246 B2
(45) Date of Patent: Jun. 28, 2011

(54) FLYING WING BOAT

(76) Inventor: Pik Wan Chan, Kowloon (HK)

(*) Notice: Subject to any disclaimer, the term of this patent is extended or adjusted under 35 U.S.C. 154(b) by 859 days.

(21) Appl. No.: 11/938,616

(22) Filed: Nov. 12, 2007

(65) Prior Publication Data

US 2009/0121071 A1 May 14, 2009

(51) Int. Cl.
*B64C 35/00* (2006.01)
*B64C 25/56* (2006.01)

(52) U.S. Cl. .................................. 244/106; 244/100 A

(58) Field of Classification Search ............ 244/46–48, 244/60, 106, 100 A, 105, 107, 17.11, 45 R, 244/23 B, 12.4; D12/2–4, 305, 324, 326, D12/333, 335, 337, 339
See application file for complete search history.

(56) References Cited

U.S. PATENT DOCUMENTS

| | | | | |
|---|---|---|---|---|
| 1,417,884 A * | 5/1922 | Bernier | ............................ | 244/6 |
| 1,834,858 A * | 12/1931 | Metzler | ............................ | 244/47 |
| D180,958 S * | 9/1957 | Papadakos | ................... | D12/328 |
| D209,252 S * | 11/1967 | Foote | ........................... | D12/327 |
| D226,783 S * | 4/1973 | Lewis | ........................... | D12/305 |
| 3,785,330 A * | 1/1974 | Fox | ................................. | 440/37 |
| 4,032,088 A * | 6/1977 | McAvoy | .................. | 244/100 A |
| 5,597,137 A * | 1/1997 | Skoglun | ...................... | 244/12.4 |
| 6,409,122 B1 * | 6/2002 | Nicolai | .......................... | 244/106 |
| 6,543,718 B2 * | 4/2003 | Provost | ........................ | 244/12.4 |
| 7,159,820 B2 * | 1/2007 | Smith et al. | ................... | 244/105 |
| D618,591 S * | 6/2010 | Nagapetyan et al. | ........... | D12/3 |
| 2002/0092949 A1 * | 7/2002 | Nicolai | .......................... | 244/106 |

* cited by examiner

*Primary Examiner* — Tien Dinh
(74) *Attorney, Agent, or Firm* — J.C. Patents

(57) ABSTRACT

A flying wing boat is provided, which comprising a fuselage provided with a cockpit at a bow thereof; a pair of main wings, each of which being pivotably connected to one side of the fuselage respectively and being provided with a flap; a pair of pontoons, each of which being provided at a tip of each main wings; at least one propeller provided at a fore part of the fuselage; and a driving system supplying power to the at least one propeller. The flying wing boat of the present invention could improve the safety and comfortability of navigation.

20 Claims, 23 Drawing Sheets

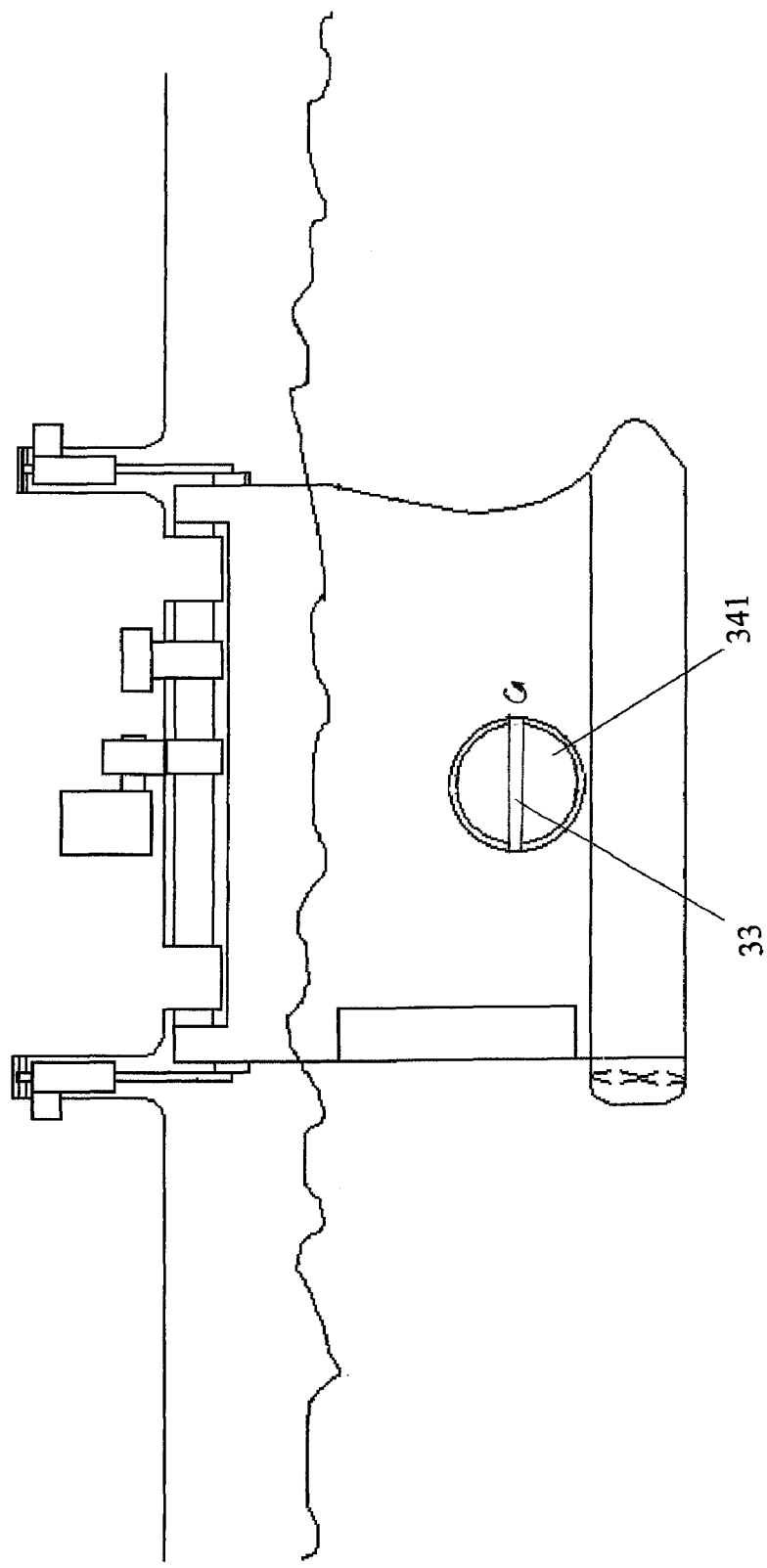

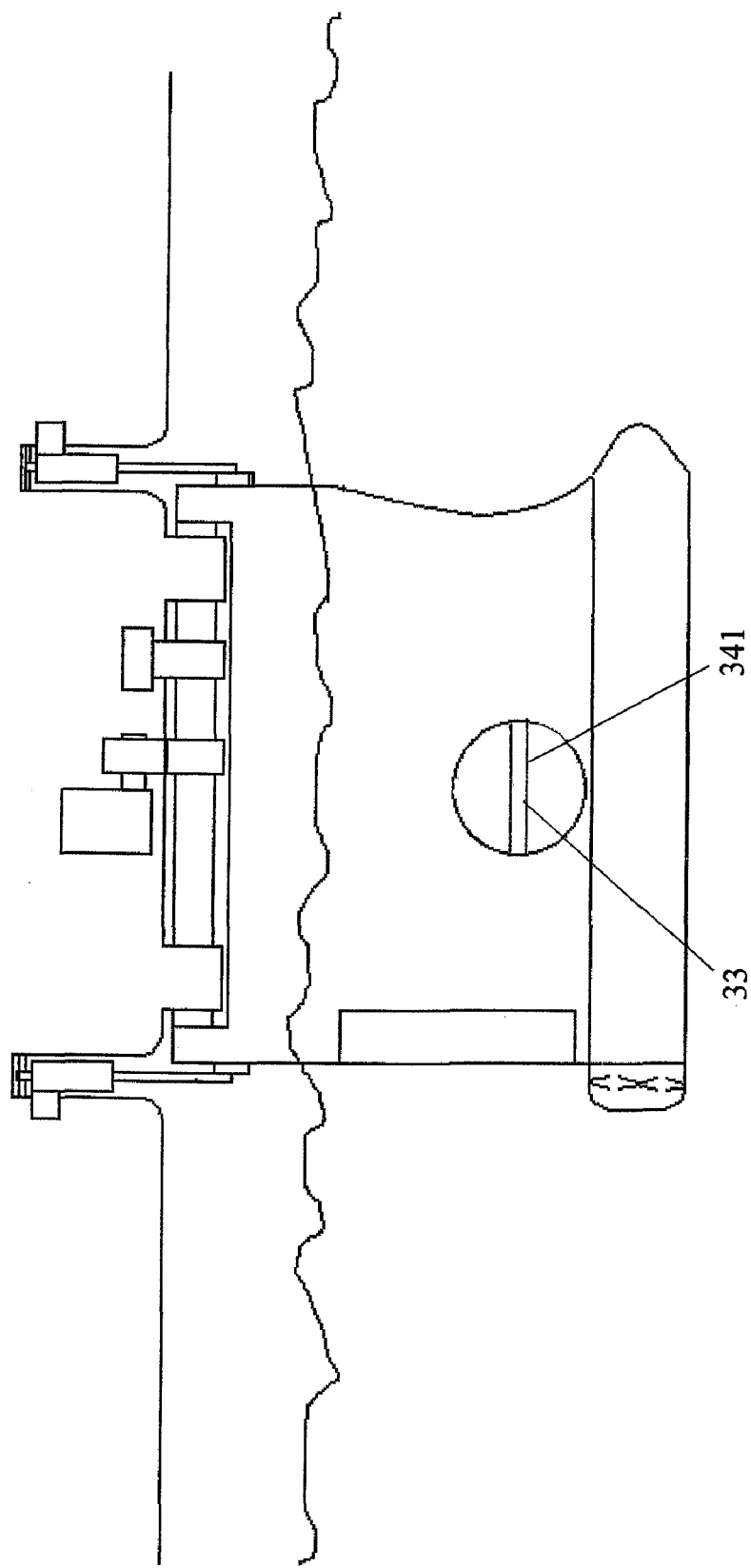

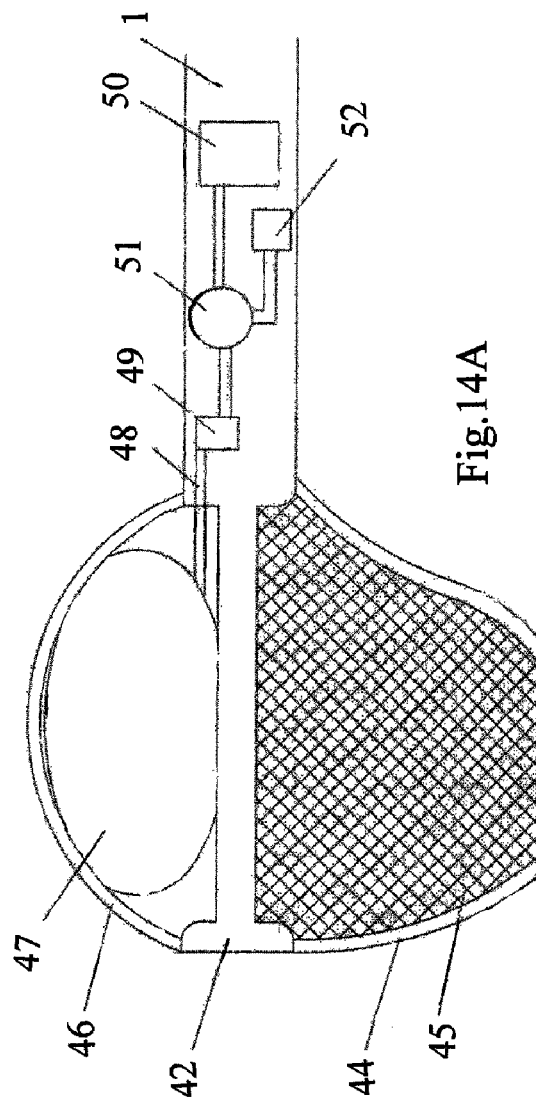
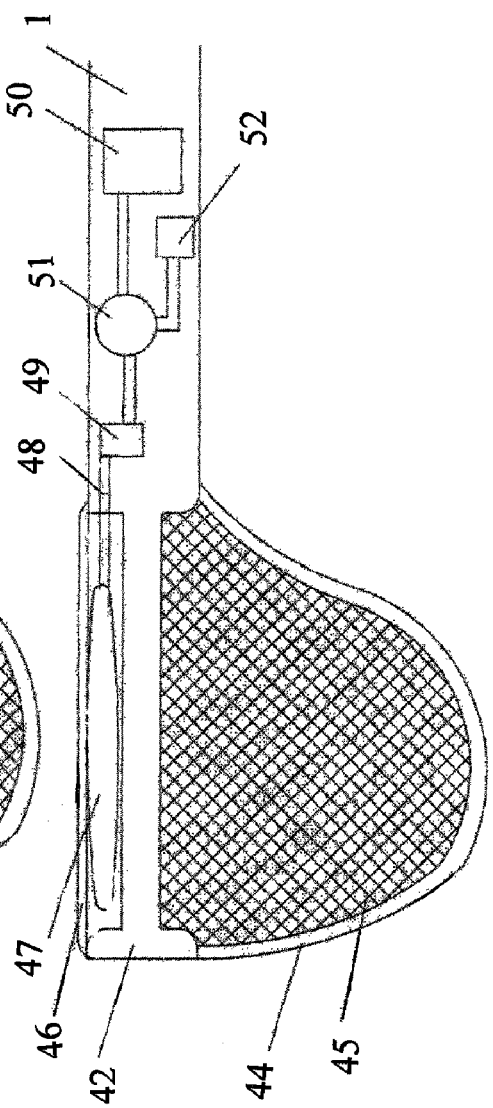
Fig.14A
Fig.14B

FLYING WING BOAT

FIELD OF THE INVENTION

The present invention relates to the field of a flying wing boat, in particular to a flying wing boat with novel fuselage and main wings.

BACKGROUND OF THE INVENTION

Presently, the existing flying wing boat (also called Wing-in-Ground Effect Vehicle) typically comprises a cylindrical fuselage, two main wings fixed to the fuselage at the roots thereof, and a planning step surface and a spray strip provided at the bottom of the fuselage. Since the wetted area of such kind of fuselage is very large, the water drag and wave friction to the flying wing boat will increase along with the increase of the traveling speed of the flying wing boat. Therefore, the existing flying wing boat are subject to a long distance of speed-up traveling to enable the main wings to generate sufficient lift, to make the fuselage take off from the water surface and plane above the water. However, during the speed-up traveling, the flying wing boat will shake and the noise will be incurred since the engine of the flying wing boat raises its power supply, and the flying wing boat will wallow upon hitting the water wave. Thus, the navigability of the flying wing boat will decrease. In addition, during the initial stage of taking off from the water, if the fuselage of the flying wing boat is hit by the wave, the flying wing boat might stall and fall onto the water again, and then, the fuselage is subject to an excessive impact load resulting in the break of the main wings or break-up of the whole flying wing boat, which might threaten the safety of the passengers and deteriorate the comfortability of navigation.

SUMMARY OF THE INVENTION

The main object of the present invention is to provide a flying wing boat which could overcome the above-mentioned problems. The novel flying wing boat of the present invention requires very short take-off traveling, and has an excellent navigability.

To achieve above-mentioned object, a flying wing boat is provided, which comprises a fuselage provided with a cockpit at a bow thereof; a pair of main wings, each of which being pivotably connected to one side of the fuselage respectively and being provided with a flap; a pair of pontoons, each of which being provided at a tip of each main wings; at least one propeller provided at a fore part of the fuselage; and a driving system for supplying power to the at least one propeller.

As the main wings are pivotably connected to the fuselage, the main wings are rotatable with respect to the fuselage, which could raise the lift to the fuselage when the flying wing boat navigates in a planning mode, and could reduce the water drag when the flying wing boat navigates in a displacement mode. In addition, the pontoons provided at the tip of the main wings are subject to buoyancy of water, to support the fuselage out off water. Thus, the water drag and wave friction could be reduced. Therefore, the flying wing boat of the present invention could improve the safety and comfortabilty of navigation.

BRIEF DESCRIPTION OF THE DRAWINGS

The foregoing and other objects, features, and advantages of the invention will be apparent from the following more particular description of preferred embodiments as illustrated in the accompanying drawings. The figures are for illustration purposes only and are not drawn to scale, in which.

FIGS. 12A-12C illustrate the states of the fluid conducting means when the flying wing boat navigates in a displacement mode;

FIG. 14A is a schematic view of a pontoon according to the present invention, illustrating that the pontoon is full filled with air;

FIG. 14B is another schematic view of the pontoon in FIG. 14B, illustrating that the pontoon is empty;

DETAILED DESCRIPTION OF THE INVENTION

Reference will now be made in detail to the preferred embodiments of the invention, which is illustrated in the accompanying figures.

Figure 1:
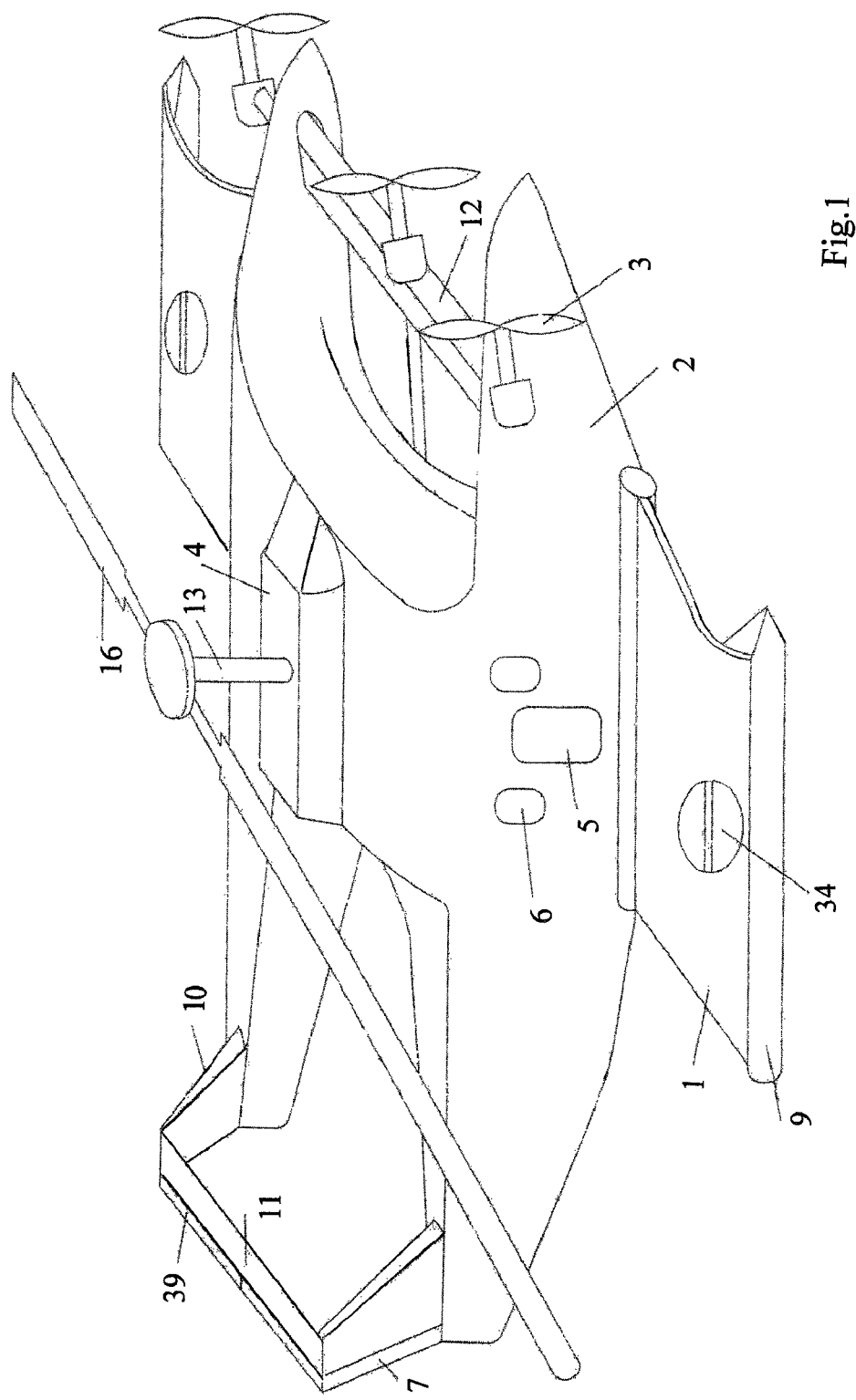
FIG. 1 is a perspective view of a first embodiment of the flying wing boat according to the present invention, illustrating that the flying wing boat navigates in a planning mode over the water.
Figure 2:
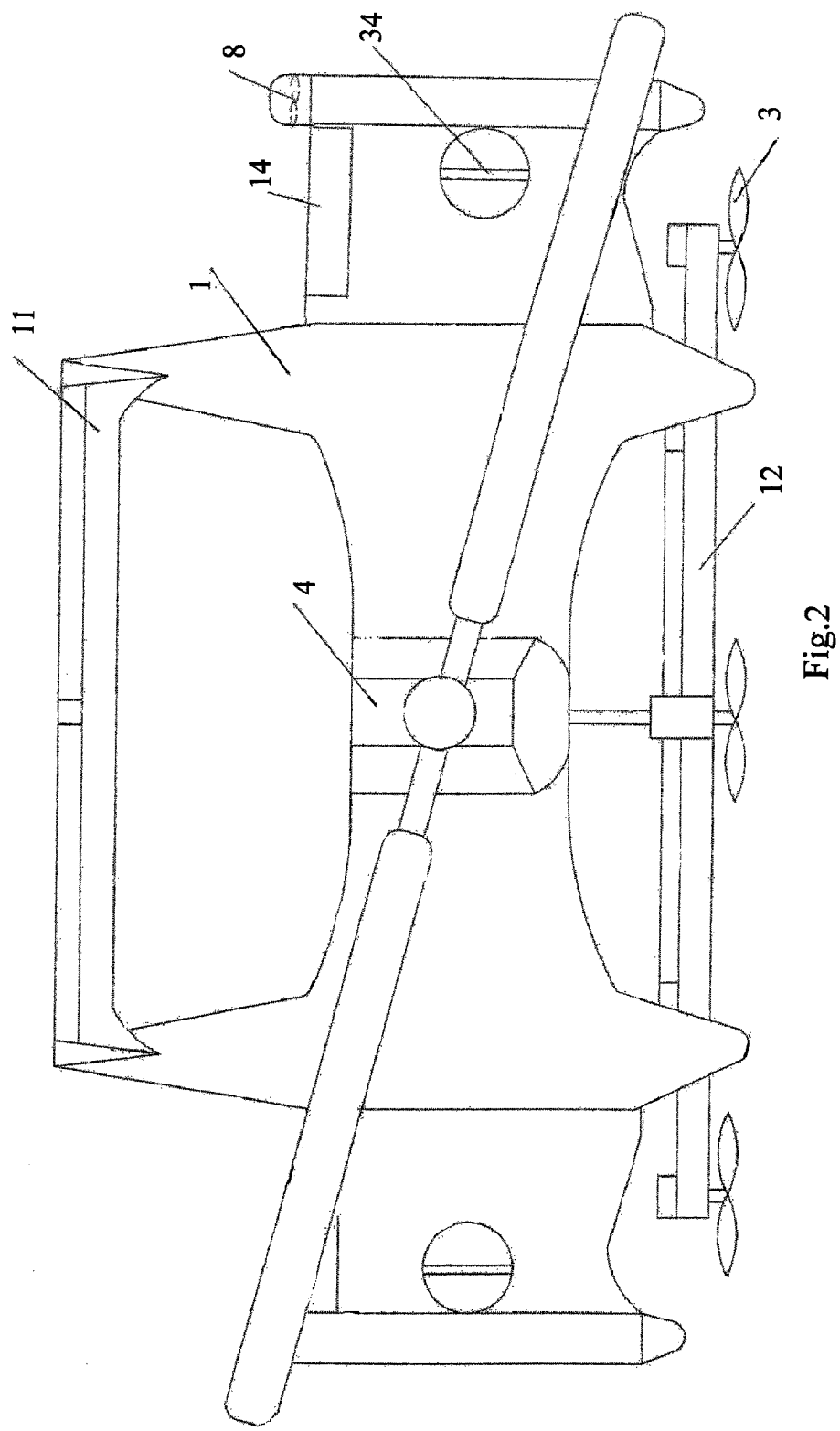
FIG. 2 is a top view of the flying wing boat in FIG. 1.
Figure 8:
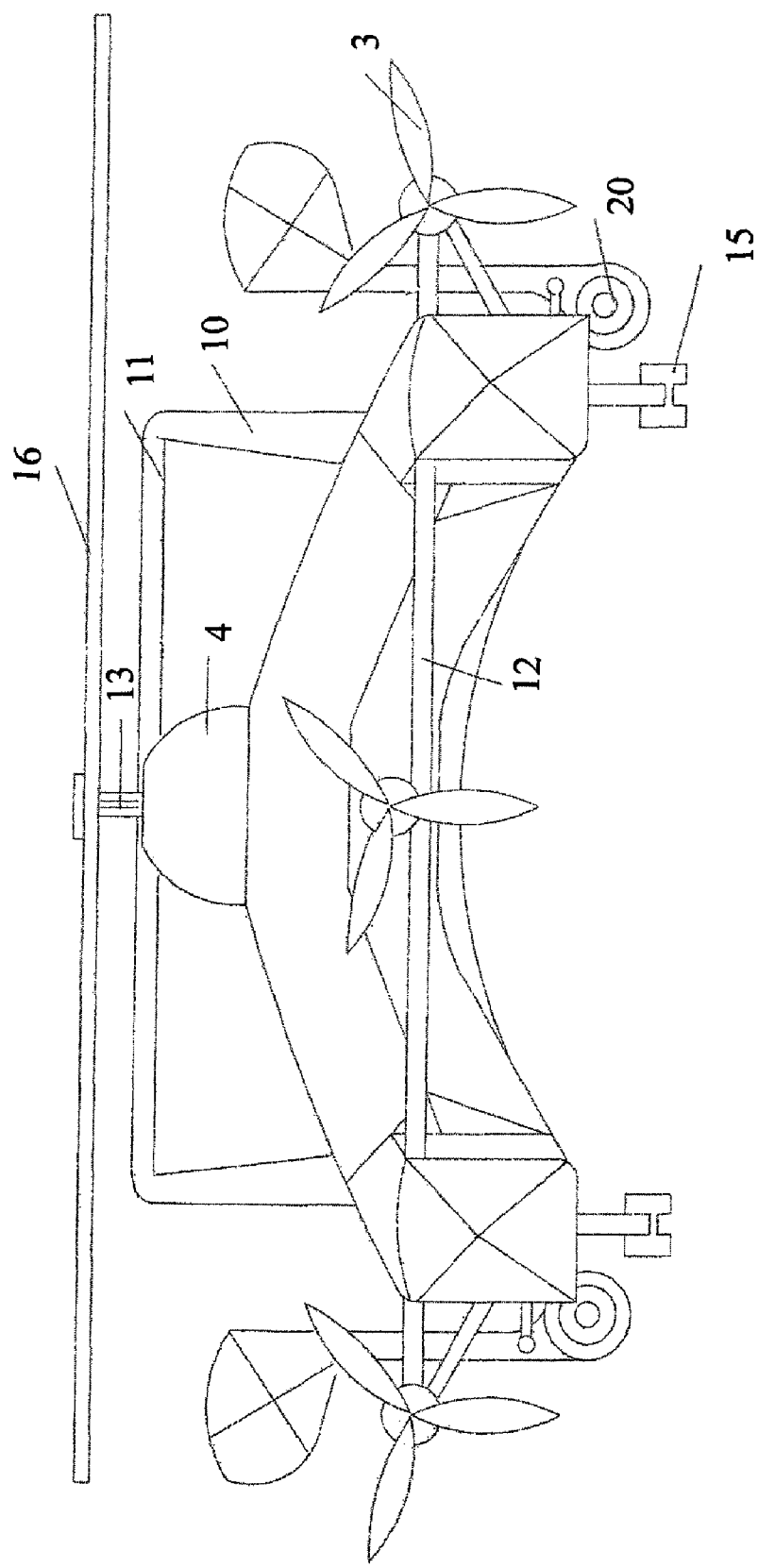
FIG. 8 is a front view of the first embodiment of the flying wing boat according to the present invention, illustrating that the flying wing boat stops on the ground.
Figure 9:
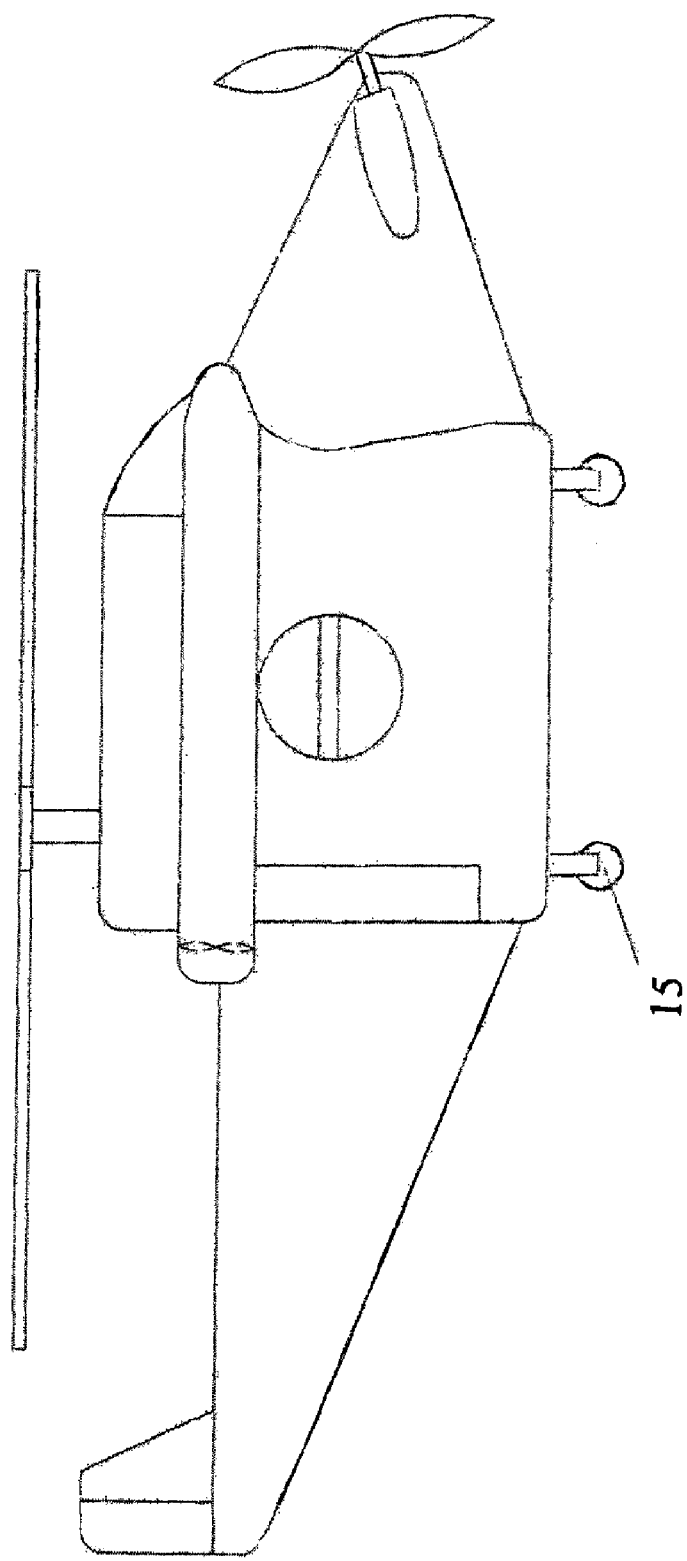
FIG. 9 is a side view of the flying wing boat in FIG. 8.

FIGS. 1-12, 14A and 14B show the first embodiment of the flying wing boat of the present invention. In the embodiment, the flying wing boat comprises a fuselage 2, a pair of main wings 1 provided with a flap 14 at the trailing edge 62 of each main wing, a pair of pontoon 9; a tail wing, and a driving system. The fuselage 2 is designed to connect to the main wings 1 to form a flying wing contour, which contour is in an "H" shape viewed from above and in an arch shape viewed from ahead. Upon viewed from side, the contour is in streamline. A cockpit 4 is provided at the top the fuselage 2, and doors 5 and scuttles 6 are provided at both sides of the fuselage 2. A rotary shaft 13 is mounted on the cockpit 4, and a rotary wing 16 is fixed on the tip of the rotary shaft 13. A pair of vertical tail wings 10 and a horizontal tail wing 11 are provided at the aft part of the fuselage 2, in which the vertical tail wings 10 connect to the fuselage 2 and the horizontal tail wing 11 bridges at the tip of the vertical tail wings 10. A rudder 7 is provided at the trailing edge of each vertical tail wing 10, and an elevator 39 is provided at the trailing edge of the horizontal tail wing 11. A horizontal front wing 12 and a plurality of propellers 3 are provided fore of the fuselage 2, in which the horizontal front wing 12 is also provided with a flap. The horizontal front wing 12 is used to improve the stability and maneuverability of the flying wing boat. In FIG. 1, three propellers 3 are provided at the fore part of the fuselage 2, i.e. the left, middle and right propellers. A plurality of wheels 15 are mounted at the bottom of the fuselage 2 to enable the flying wing boat to move freely upon stopping on the ground. As shown in FIGS. 8 and 9, four wheels 15 are provided to improve the stability of the flying wing boat, however, the number of wheels could also be three or more.

Each of the main wings 1 is pivotably connected to one sidewall of the fuselage 2 respectively at the root thereof. A pontoon 9 is provided at the tip of each main wing 1. A thruster 8 is provided at the back end of each pontoon 9 to operate when the flying wing boat navigates in a displacement mode at a low speed. As shown in FIGS. 14A and 14B, in the present invention, each pontoon 9 consists of a rigid shell part and a ballonet part which are opposite to each other with respect to the wing beam 41 of the main wing 1. The rigid shell part comprises a first outer shell 44 made of rigid material, such as rigid plastic, aluminum, aluminum alloy or other suitable material, and foam material 45, such as polyurethane, filled within the first outer shell. The ballonet part comprises a second outer shell 46 made of elastic material, such as vulcanized rubber, and a plurality of gasbags 47 made of plastic provided within the outer shell 46. Each gasbag 47 has an opening 48 communicating with a gas transmission pipe 51 via a charging valve 49 and a discharging valve 52, and the gas transmission pipe 51 communicates with a gas charging pump 50 mounted on a wing beam 41 of the main wing 1. When charging the gasbags 47, both of the charging valve 49 and the gas charging pump 50 are turned on, and then the gas charging pump 50 charges the gasbags with gas via the gas transmission pipe 51 and the opening 48. When discharging the gasbags 47, both of the discharging valve 52 and the charging valve 49 are turn on, and then the second outer shell 46 will press the gasbags 47 and empty the gas therein through the openings 48 and the gas transmission pipe 51. With the combination of the rigid shell part and the ballonet part, the volume of the pontoons 9 could be variable, to reduce the air resistance to the flying wing boat when the flying wing boat navigate in a planning mode.

Figure 10:
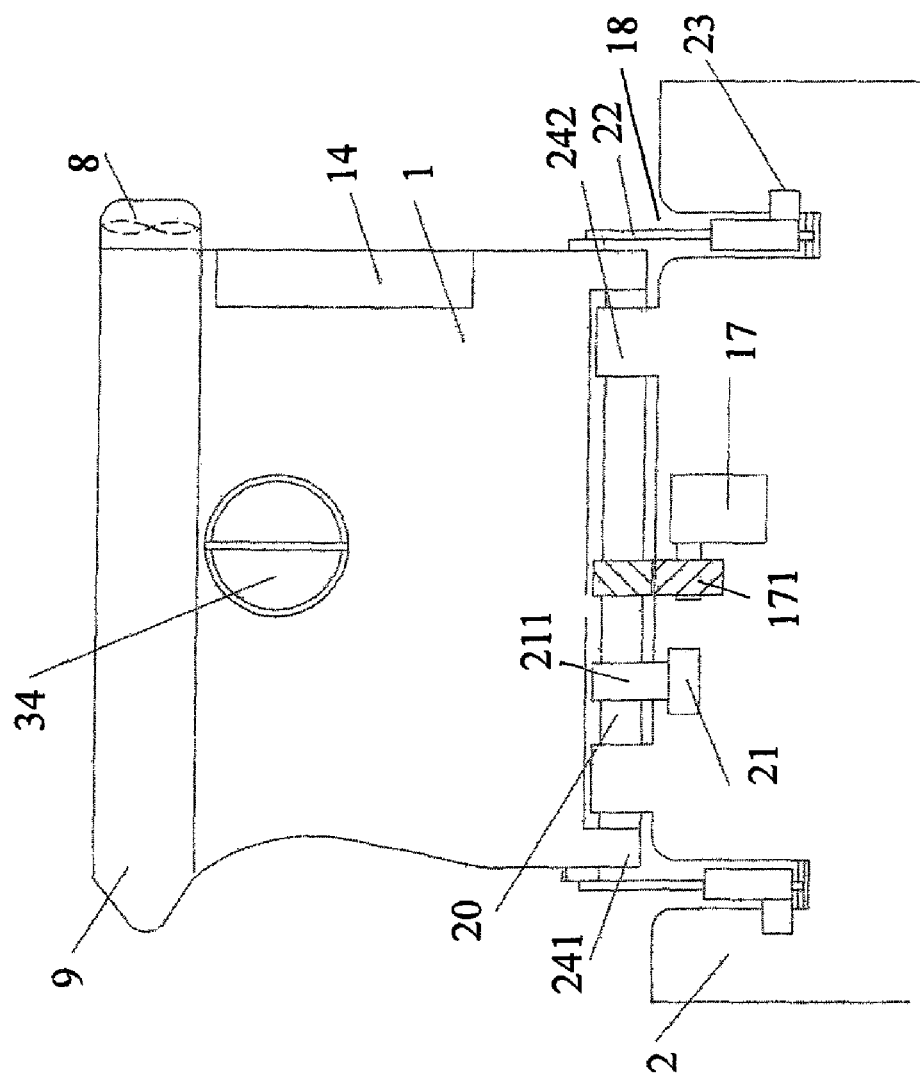
FIG. 10 is a schematic view of an actuating and locking means of a main wing of the first embodiment.

FIG. 10 shows the actuating and locking means of a main wing 1 of the present invention. As the left part of the flying wing boat is symmetrical to the right part, the corresponding figures only illustrate one part of the flying wing boat of the present invention. The actuating and locking means could rotate and lock the main wing 1 with respect to the fuselage 2, which comprises a pivot 20 which is fixedly connected to the main wing 1 and pivotably connected to the fuselage 2; a first actuator 17, such as a first motor which is connected to the pivot 20 via a gear set 171; a first brake 21 which is also connected to the pivot 20 via a gear set 211. For example, the pivot 20 could be fixed to the main wing 1 at the protrusion 241 of the main wing 1, and could be pivotably connected to the fuselage 2 by passing through the hole formed in the protrusion 242 of the fuselage 2. The gears of the gear set 171 are fixed to the pivot 20 and the output shaft of the first actuator 17 respectively; thus, the first actuator 17 could rotate the pivot 20, and in turn rotate the main wing 1. The gears of the gear set 211 are fixed to the pivot 20 and the first brake 21 respectively; thus, the first brake 21 could stop the rotation of the pivot 20, and in turn stop the rotation of the main wing 1. The first brake 21 could be any type of brake known in this field.

In addition, to rotate of the main wing 1 more effectively, a plurality of linear actuators 18 could also be provided. Each linear actuator 18 comprises a main body 23 and an actuating rod 22. The actuating rod 22 could extend from and retract to the main body 23, to enable rotate the main wing 1 with respect to the fuselage 2. As shown in FIG. 10, two linear actuator 18 are provided, in which the main bodies 23 of the linear actuators 18 are pivotably mounted on the bottom of the fuselage 2, and the actuating rods 22 of the linear actuators 18 are pivotably connected to the leading edge 42 and the trailing edge 62 of the main wing 1 respectively.

Figure 11:
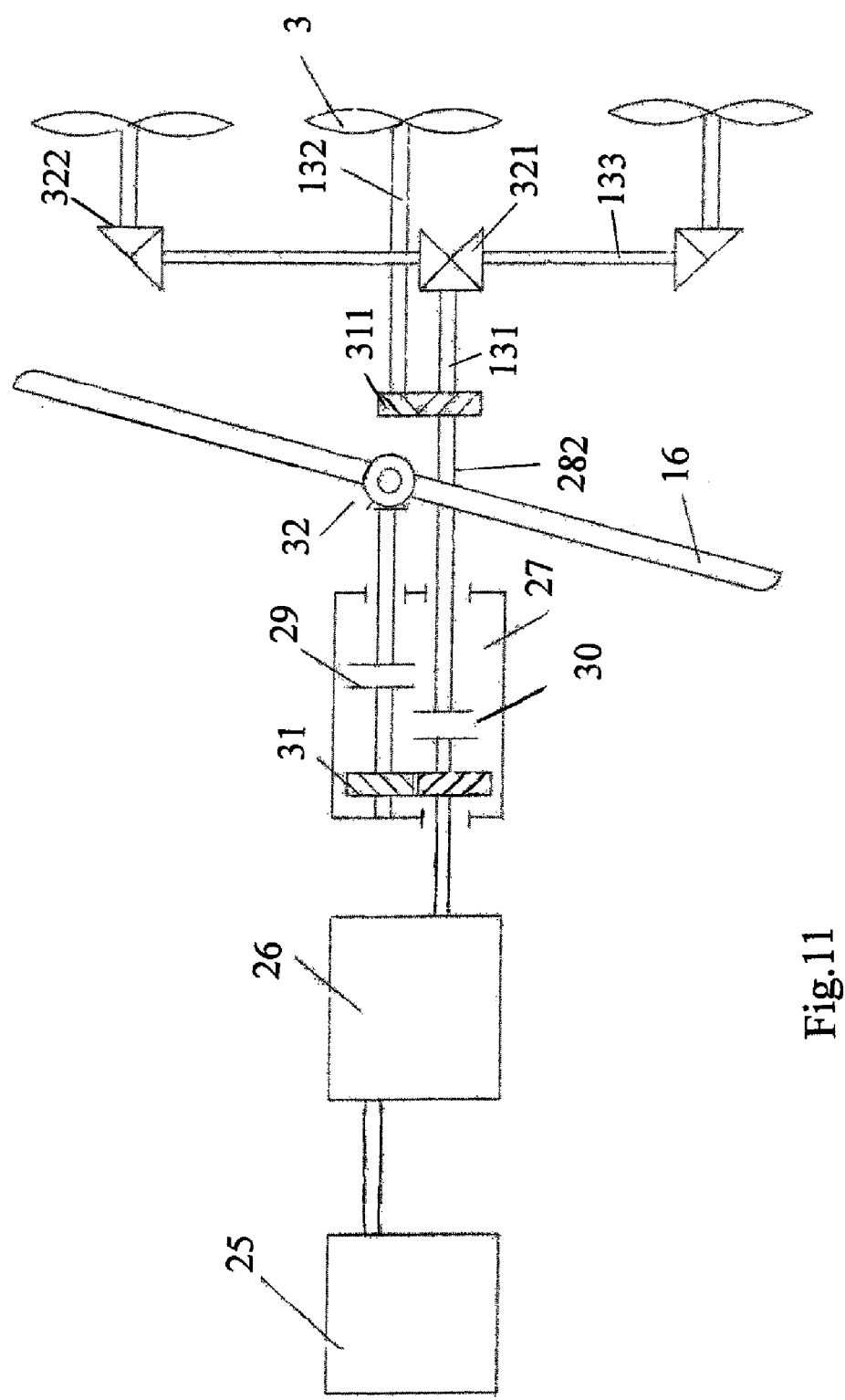
FIG. 11 is a schematic view of a driving system of the first embodiment of the flying wing boat according to the present invention.

FIG. 11 illustrates an embodiment of the driving system of the flying wing boat of the present invention. The driving system comprises a main motor 25 mounted at the top part of fuselage 2 behind the cockpit 4; a reducer 26 connected to the main motor 25 to receive the power output from the main motor 25; and a clutch device 27 connected to the reducer 26, in which the clutch device 27 includes a first gear set 31, a first clutch 29 and a second clutch 30. The first gear set 31 is used to divide and transmit the power received from the reducer 26 to the rotary wing 16 and the propellers 3 respectively. The first clutch 29 is set in the power transmission path to the rotary wing 16, while the second clutch 30 is set in the power transmission path of the propellers 3. The output shaft 281 of the first clutch 29 is connected with the rotary shaft 13 via a second gear set 32, such as a set of bevel gears. The output shaft 282 of the second clutch 30 is connected with a first input shaft 131 and a second input shaft 132 via a third gear set 311. The second input shaft 132 is used to input the power to the middle propeller by connecting with the propeller directly. The first input shaft 131 is used to input the power to the left and right propellers via several gear sets 321 and 322, such as sets of bevel gears, and connecting rods 133. With engagement of the first clutch 29, the power output from the main motor 25 could be transmitted to the rotary wing 16. However, with the disengagement of the first clutch 29, the rotary wing 16 could not receive power. With the engagement of the second clutch 30, the power output from the main motor 25 could be transmitted to the three propellers 3. However, with the disengagement of the second clutch 30, the propellers could not receive power. Thus, the clutch device 27 could control whether or not to supply power to the rotary wing 16 and the propellers 3.

Figure 12:
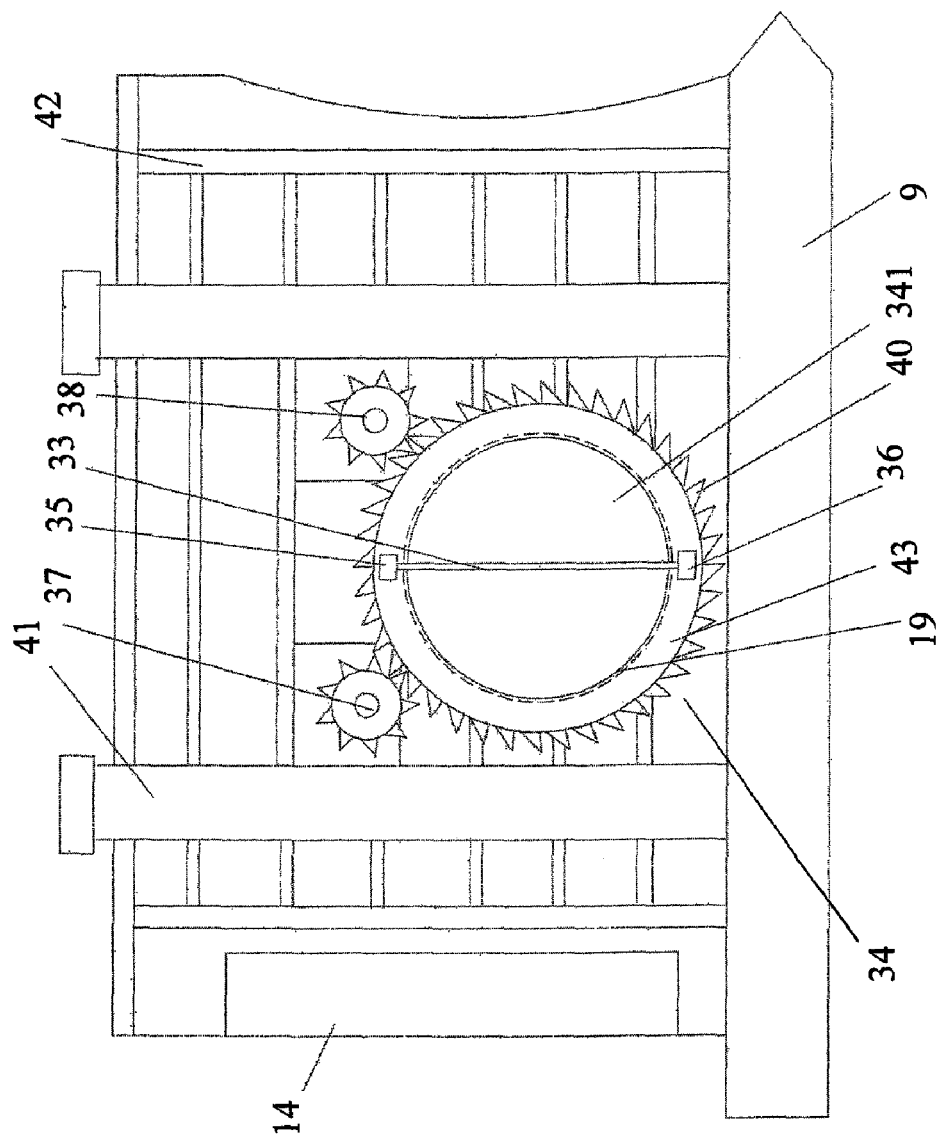
FIG. 12 is a schematic view of a first embodiment of a fluid conducting means according to the present invention.

The flying wing boat of the present invention further comprises a novel fluid conducting means 34 provided at middle part of each main wing 1, as shown in FIG. 10. The structure of the first embodiment of the fluid conducting means 34 is illustrated in FIG. 12. The fluid conducting means comprises: a gear wheel 40, which includes an inner ring 19 fixedly mounted on the main wing 1 and an outer ring 43 provided with a plurality of teeth on the outer surface thereof and rotatable with respect to the inner ring 19, in which there is a through hole provided in the main wing 1 to correspond to the through hole at the center of the inner ring 19; a second motor 38 engaging with the gear wheel 40 via a gear mounted on the output shaft thereof to rotate the gear wheel 40; a second brake 37 engaging with the gear wheel 40 to stop the rotation of the latter; a middle shaft 33 bridging the inner ring 19 and revolvably mounted on the outer ring 43 at both ends thereof along the diameter of the gear wheel 40; a third motor 35 mounted on the outer ring 43 and connecting to one of the ends of the middle shaft 33 to make the middle shaft 33 revolve about the longitudinal axis of itself, a third brake 36 mounted on the outer ring 43 and connecting to the other end of the middle shaft 33 to stop the revelution of the middle shaft 33; and a conducting plate 341 attached to the middle part of the middle shaft 33, in which the size of the conducting plate 341 is identical to that of the through hole of inner ring 19 to be able to rotate within the inner ring. With the revolution of the middle shaft 33, the conducting plate 341 is driven to rotate with respect to inner ring 19, to enable to close or open the through hole of the inner ring 19.

The fluid conducting means 34 has two degree of freedom, i.e. with the rotation of the gear wheel 40 and the revolution of middle shaft 33, the conducting plate 341 could be rotated in two dimensions. When the flying wing boat is in the displacement mode, the conducting plate 341 is immersed in the water and could be used as a rudder, to enable the flying wing boat to turn left or right. Particularly, the second motor 38 rotates the gear wheel 40 and in turn rotates the middle shaft 33, to make the middle shaft 33 be perpendicular to fuselage 2. Then, the third motor 35 rotates the middle shaft 33 and in turn rotates the conducting plate 341, just like steering a rudder, which could alter the heading direction of the flying wing boat.

When the flying wing boat navigates in a semi-planning mode, the conducting plate 341 is used to conduct fluid. In this case, the second motor 38 rotates the gear wheel 40 and in turn rotates the middle shaft 33, to make the middle shaft 22 be parallel to longitudinal axis of the fuselage 2. Then, the third motor 35 rotates the middle shaft 33 to make the conducting plate 341 be parallel to surface of the main wing 1. Therefore, the through hole of inner ring 19 could conduct part of the water around the main wing 1, which may reduce the adhesive resistance of the water flow to the main wing 1.

The operation of the flying wing boat of the present invention is described in detail with reference to FIGS. 1 to 9.

Figure 3:
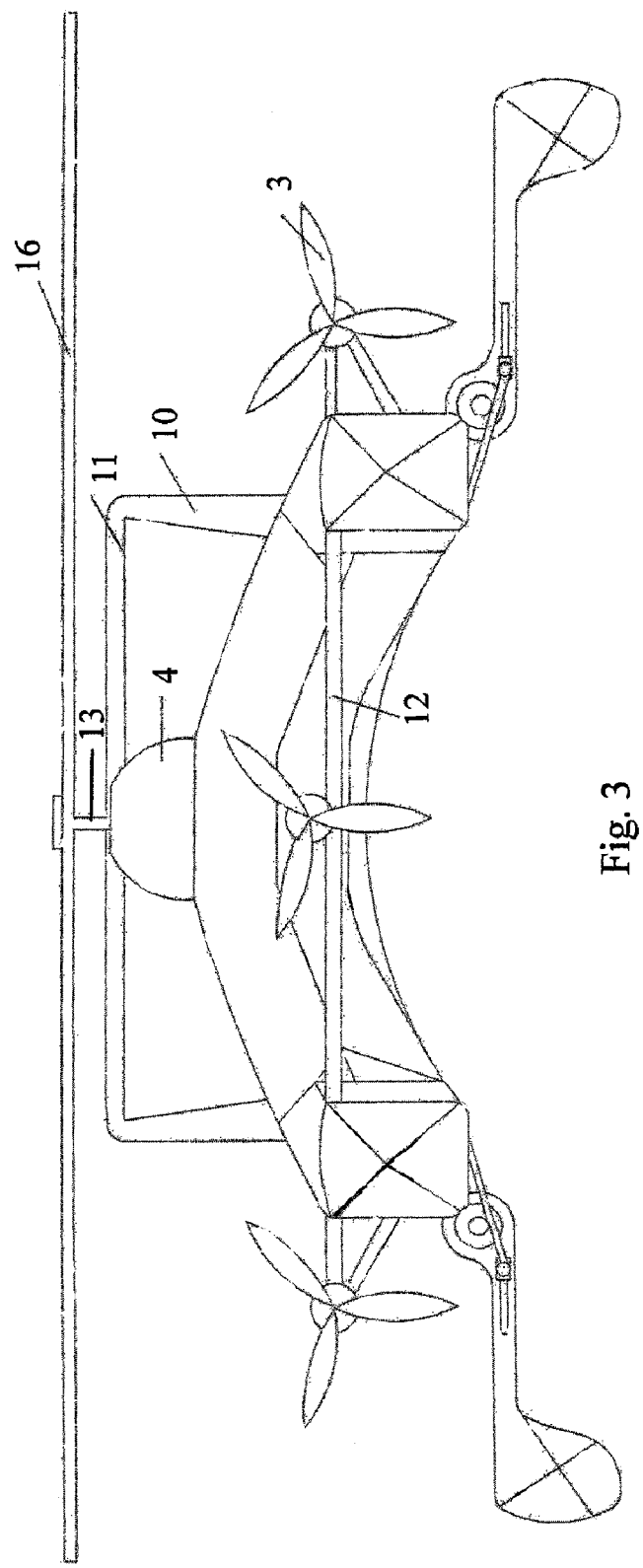
FIG. 3 is a bottom view of the flying wing boat in FIG. 1.
Figure 4:
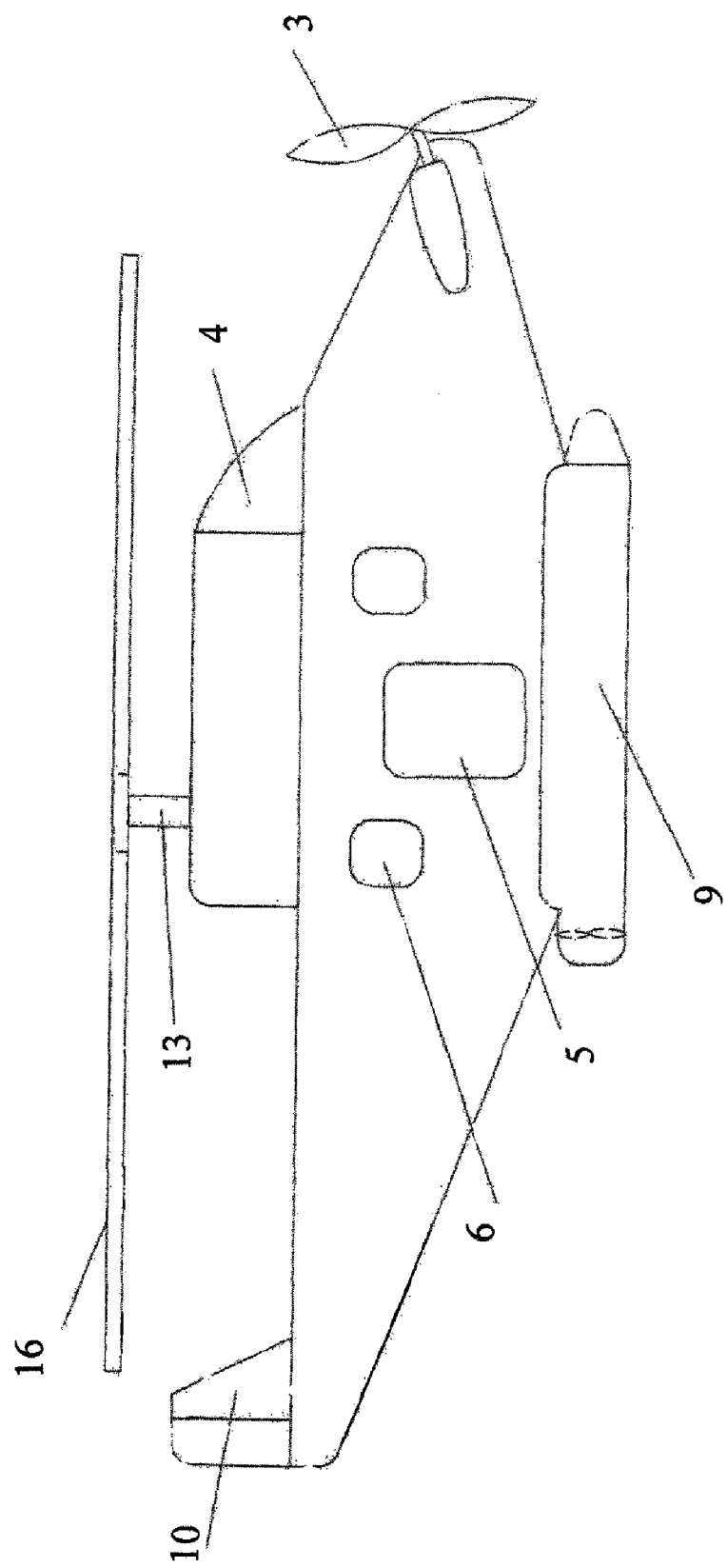
FIG. 4 is a side view of the flying wing boat in FIG. 1.

FIGS. 1 to 4 illustrate that the flying wing boat takes off from the water and navigates in a planning mode at a high speed. When pontoons 9 leave the water, the thrusters 8 stop. To make the surface of the main wings be parallel to the water surface as shown in FIG. 3, the first motors 17 are turned on and rotate the main wings 1 upward by about 90 degree, and then, the first brakes 21 start to lock the pivots 20, to prevent further rotation of the main wings 1. Thus, a lift could be applied to the flying wing boat to overcome its gravity. At the same time, the third brakes 36 release the middle shafts 33, and the third motors 35 are turned on to make the middle shafts 33 revolve by 90 degree. Thus, the conducting plates 341 fixed to the middle shaft 33 will be rotated to be parallel to the surface of the main wings 1. Thus, the through holes of the inner rings 19 of the gear wheels 40 could be closed by the respective conducting plates 341, to reduce the communication of the air around the main wings 1 through the through holes of the main wings 1 and the inner rings 19. Therefore, the lift of the flying wing boat could be maintained. Under such condition, the discharging valves 52 start to discharge the air within the gasbags 47 of the pontoons 9, to reduce the volume of the pontoons 9. Thus, the air resistance to the pontoons 9 could be reduced. Meanwhile, the main motor 25 drives the propellers 3 to rotate at a high speed, which could push the flying wing boat forward and make the flying wing boat take off from the water completely and navigate in a planning mode at a high speed.

Figure 5:
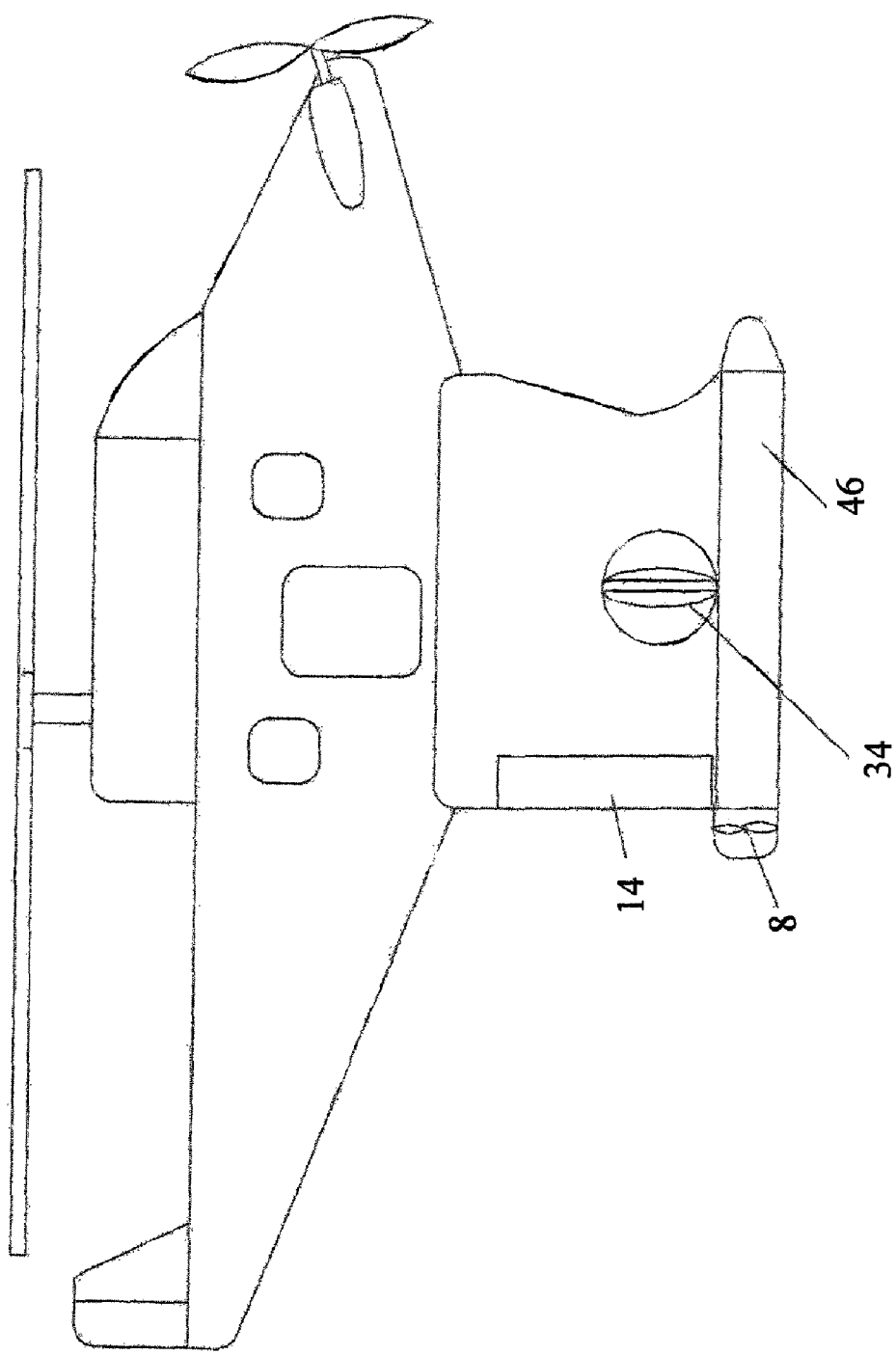
FIG. 5 is a top view of the first embodiment of the flying wing boat according to the present invention, illustrating that the flying wing boat navigates in a displacement mode.
Figure 6:
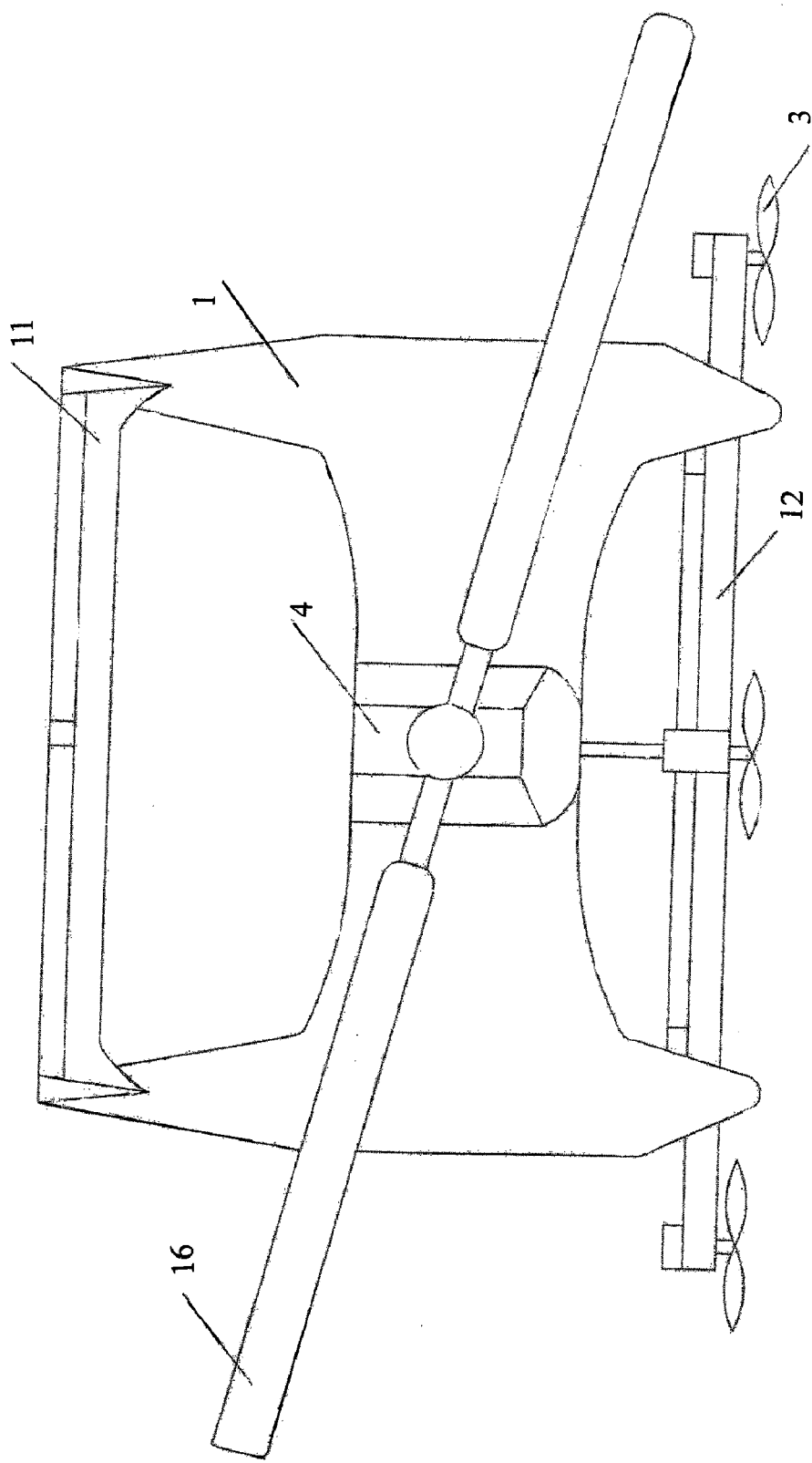
FIG. 6 is an above view of the flying wing boat in FIG. 5.
Figure 7:
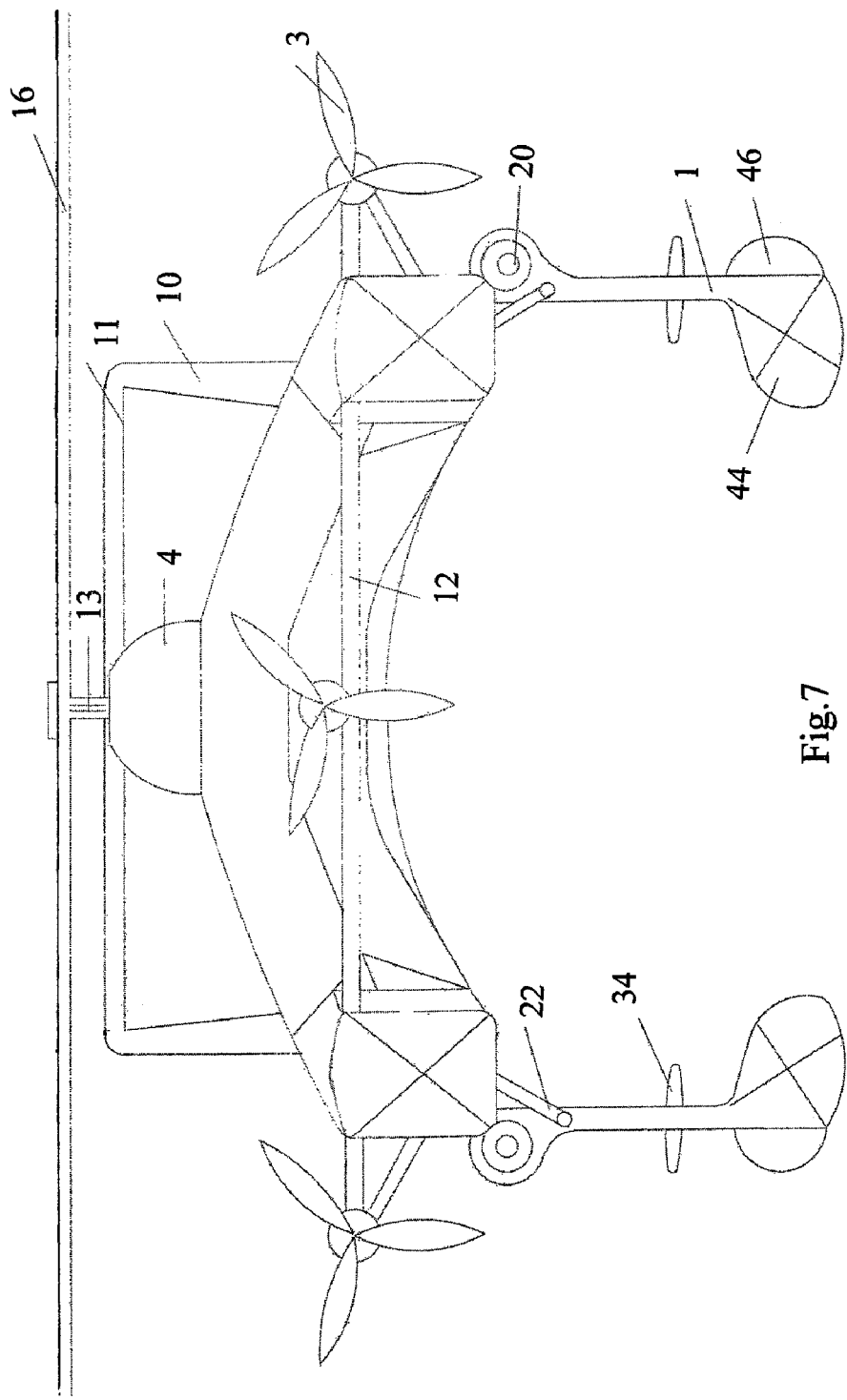
FIG. 7 is a front view of the flying wing in FIG. 5.

FIGS. 5-7 illustrate that the flying wing boat navigates in a displacement mode at a low speed. In the displacement mode, the main wings 1 are perpendicular to the water surface, as shown in FIG. 7. Each actuating rod 22 forms a triangle together with the adjacent main wing 1 and the fuselage 2, to make the first brakes 21 prevent the rotation of the main wings effectively. Under such condition, the pontoons 9 provided at the tips of the main wings 1 are immersed in the water. At this time, the gasbags 47 within the pontoons 9 are full charged with gas, to support the fuselage 2 out off the water by virtue of the buoyancy of the pontoons 9. Then, the thrusters 8 will be turned on to drive the flying wing boat forward.

Figure 12A:
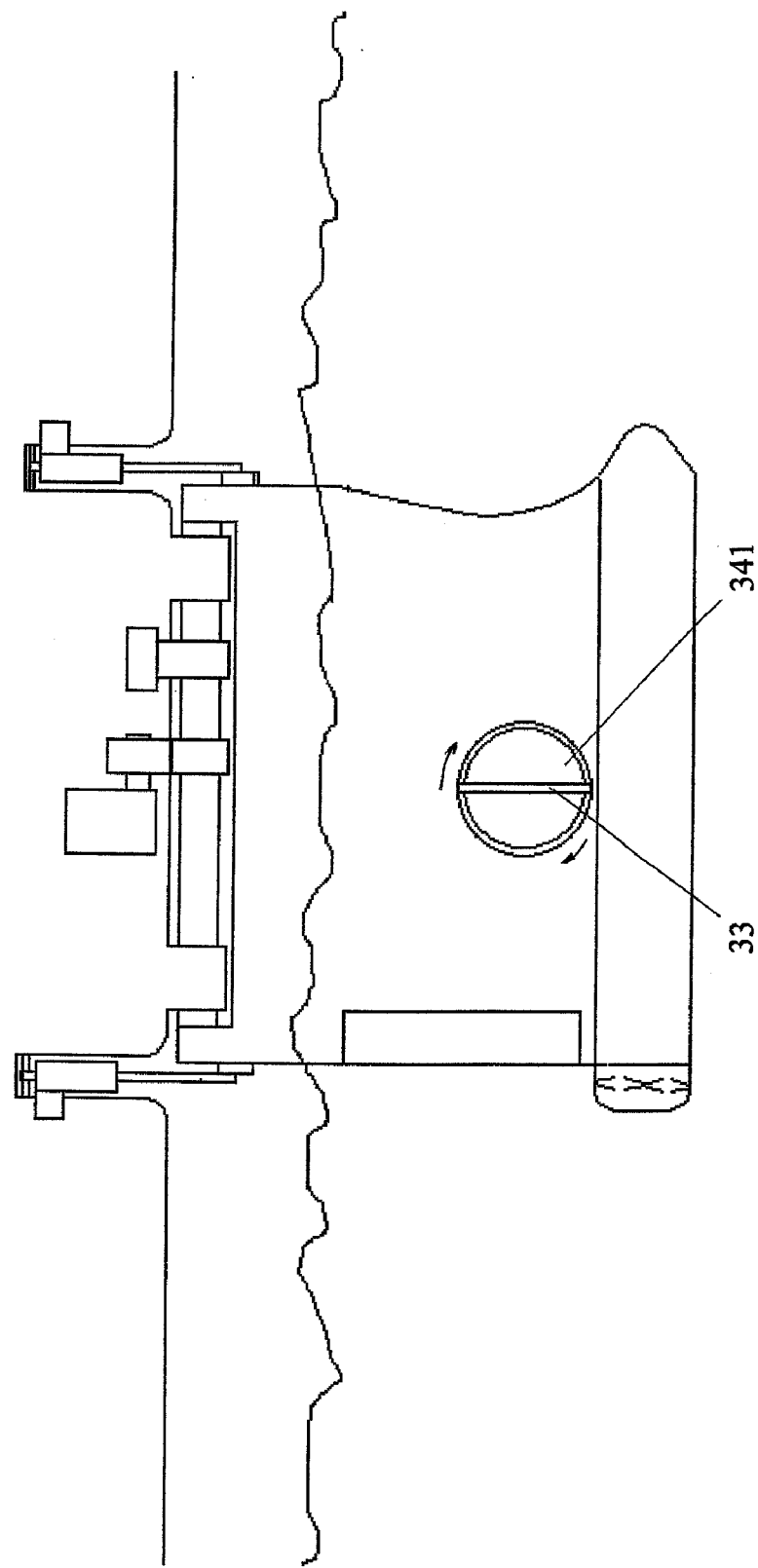
Figure 13:
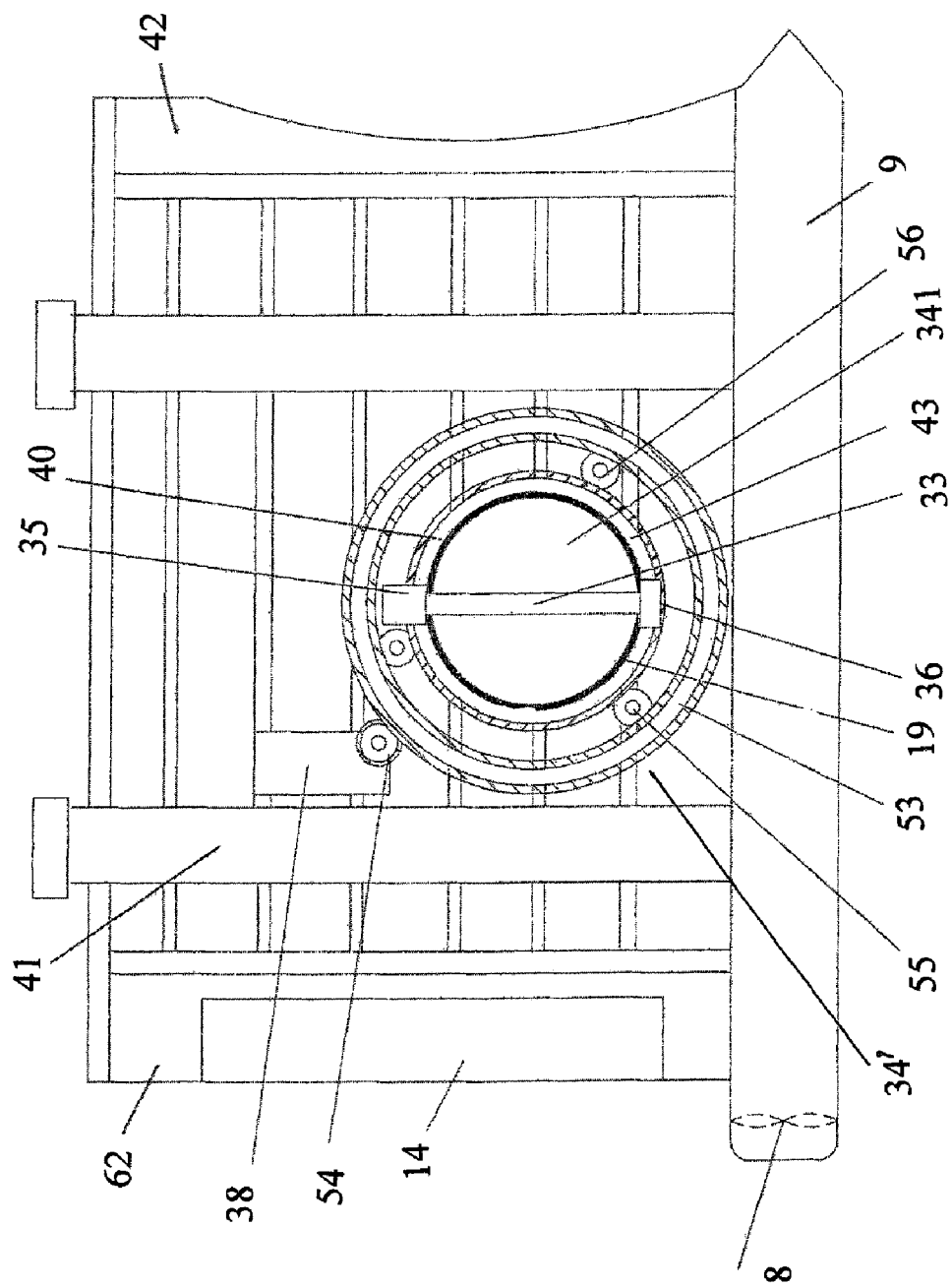
FIG. 13 is a schematic view of a second embodiment of a fluid conducting means according to the present invention.

Initially, the conducting plates 341 and the middle shafts 33 are in the state shown in FIG. 12A. After the flying wing boat departs from the dock and enters a main fairway, the second motors 38 are turned on to rotate the gear wheel 40 by about 90 degree along the direction indicated by the arrows in FIG. 12A, to make the middle shafts 33 be parallel to the longitudinal axis of the fuselage 2, as shown in FIG. 12B. And then, the third motors 35 are turned on to make the middle shafts 33 revolve about 90 degree along the direction indicated by the arrow in FIG. 12B, which make the conducting plates 341 rotate to be parallel to the surface of the main wings 1. Consequently, the conducting plates 341 open the through holes of the inner rings 19 of the gear wheels 40 completely, as shown in FIG. 12C. And then, the third brakes 36 start to lock the middle shafts 33 to prevent further rotation of the conducting plates 341. Next, the main motor 25 is turned on and the first clutch 29 is engaged, to transmit the power output from the main motor 25 to the rotary shaft 13. Initially, the rotary wing 16 is in a zero pitch angle state. With the rotation of the rotary shaft 13, the rotary wing 16 starts to rotate at a higher speed than its normal speed during flying. Then, the first clutch 29 is disengaged and the second clutch 30 is engaged. Thus, the power output from the main motor 25 is transmitted to the propellers 3 via the second clutch 30, which make the flying wing boat start to navigate at an accelerated speed. At this time, plenty of air enters from the bow of the fuselage into the space formed between the bottom of the fuselage 2 and the water surface as well as between the main wings 1 and the water surface, and is compressed there. Thus, the so-called "dynamic-pressure air cushion effect" occurs due to relative movement between the flying wing boat and the water surface, which may lift the fuselage step by step and make the flying wing boat navigate in a semi-planning mode at a medium speed.

With the increase of speed of the flying wing boat, the adhesive resistance to the surface of the main wings 1 increases due to the repulsion of water flow resulting from the increase of the rate of water flow. At this time, the conducting plates 341 have open the through holes of the inner rings 19 of the gear wheels 40 completely, thus, the through holes of inner rings 19 conduct part of the water flow, which may reduce the adhesive resistance of the water flow to the main wings 1. At the later stage of the semi-planning mode, the conducting plates 341 could provide a lift to the flying wing boat in such manner that, the second motors 38 rotate the gear wheels 40 slowly to finely adjust the orientation of the conducting plates 341 to form feathering angles between the conducting plates 341 and the water flow, which is so-called "hydroski effect". At this time, the conducting plates 341 generate "hydrodynamic lift" (Daniel Bernoulli's Principle). Then, the pitch angle of the rotary wing 16 is increased, to make the rotary wing 16 to release the reserved rotational kinetic energy instantly to generate "vertical lift", which works on the fuselage 2 to result in "dynamic-pressure air cushion effect". When the lift generated by the above three factors is larger than the static buoyancy of water supporting the fuselage 2 (Archimedes Principle), the flying wing boat moving forward is pulled off from the water surface rapidly.

Especially, when the risk situation, such as stall of the boat, wind shear, motor fault and so on happens, since the flying wing boat has an inertia, the wind flow could continue driving the rotary wing 16 to rotate, resulting in so called "wind milling effect", which could make the flying wing boat to glide and to land on the water surface safely. Thus, the safety and comfortability of navigation of the present flying wing boat could be improved. The rotary wing 16 employed in the first embodiment of the present invention is an automatic rotary wing, which is engaged with the driving system before the boat takes off from the water, and then, it is disengaged with the driving system during the flying of the boat. Thus, the rotary wing 16 will not apply torque to the fuselage 2.

When the flying wing boat is to arrive at the destination, in order to make the surface of the main wings 1 be perpendicular to the water surface, the first brakes 21 will release the pivots 20, and then the first motors 17 are turned on to rotate the main wings 1 downward by about 90 degree. Consequently, the first brakes 21 will lock the pivots 20 again. At this time, the charging valves 49 are turned on, and the gas-bags 47 within the pontoons 9 are charged with air by virtue of the charging pump 50. When the flying wing boat lands on the water, the pontoons 9 provided at the tips of the main wings 1 will be immersed into the water firstly, and the water friction reduces the speed of the boat rapidly. The buoyancy of the water to the pontoons 9 supports the fuselage 2 above the water surface. Then, the thrusters 8 are turned on, which make the flying wing boat navigate in displacement mode at a low speed to approach to the dock.

FIGS. 8 and 9 illustrate that the flying wing boat stops on the ground. Under such condition, the main wings 1 are rotated upward to close to the fuselage 2 as shown in FIG. 8, and the fuselage 2 is supported by the wheels 15. Thus, the flying wing boat could also move freely on the ground, and the occupant area of the flying wing boat could be reduced.

Figure 15:
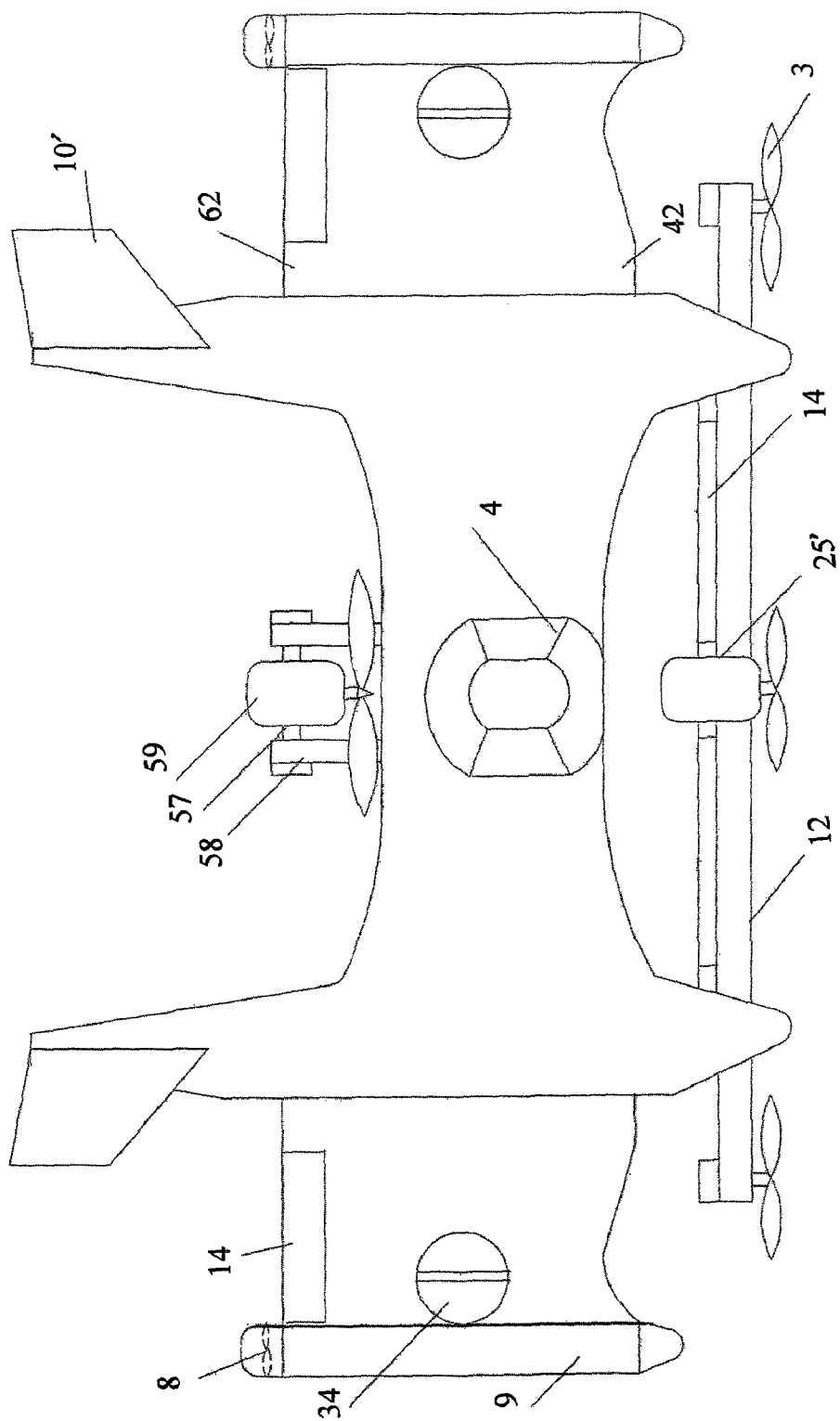
FIG. 15 is a top view of a second embodiment of the flying wing boat according to the present invention, illustrating that the flying wing boat navigates in a planning mode over the water.

FIG. 15 illustrates the second embodiment of the fluid conducting means of the present invention.

As shown in FIG. 15, the second embodiment of the fluid conducting means is also provided at the middle part of each main wing 1, just like the first embodiment. Each fluid conducting means 34' of the second embodiment comprises: a gear wheel 40, which includes an inner ring 19 fixedly mounted on the main wing 1 and an outer ring 43 provided with a plurality of teeth on the outer surface thereof and rotatable with respect to the inner ring 19, in which there is a through hole provided in the main wing 1 to correspond to the through hole at the center of the inner ring 19; a middle shaft 33 bridging the inner ring 19 and revolvably mounted on the outer ring 43 at both ends thereof along the diameter of the gear wheel 40; a third motor 35 mounted on the outer ring 43 and connecting to one of the ends of the middle shaft 33 to make the middle shaft 33 revolve about the longitudinal axis of itself; a third brake 36 mounted on the outer ring 43 and connecting to the other end of the middle shaft 33 to stop the revelution of the middle shaft 33; and a conducting plate 341 attached to the middle part of the middle shaft 33, in which the size of the conducting plate 341 is identical to that of the through hole of inner ring 19 to be able to rotate within the inner ring. With the revolution of the middle shaft 33, the conducting plate 341 is driven to rotate with respect to inner ring 19, to enable to close or open the through hole of the inner ring 19. The second embodiment of the fluid conducting means 34' further comprises: a plurality of planet gears 55 supported on a plurality of gear shafts 56 and engaged with the gear wheel 40; a worm gear wheel 53 with inner teeth provided at the inner surface thereof and outer teeth provided at the outer surface thereof, in which the worn gear wheel 53 is engaged with the planet gears 55 by virtue of its inner teeth; a second motor 38 provided a worm 54 at its output shaft, in which the worm 54 is engaged with the outer teeth of the worm gear wheel 53. The second motor 38 and the gear shafts 56 are both mounted on the wing beam 41 of the main wing 1. When the second motor 38 is turned on, the worn 54 on the output shaft of the second motor 38 will rotate the worm gear wheel 53. Consequently, the worm gear wheel 53 will rotate the planet gears 55, and in turn rotate the gear wheel 40. Thus, the middle shaft 33 and the conducting plate 341 will rotate together with the outer ring 43 of the gear wheel 40. As the combination of worm, worm gear wheel and planet gears has self-locking function, the second brake 37 of the first embodiment could be omitted. The operation of the third motor 35 and third brake 36 in the second embodiment is identical to that in the first embodiment. Comparing the fluid conducting means of first embodiments, the force applied to the gear wheel 40 is more uniformly, which make the gear wheel 40 rotate more smoothly. Although the construction of the fluid conducting means in the second embodiment is a little different from that in the first embodiment, the three navigation modes of the flying wing boat employing the second embodiment of the fluid conducting means 34' are identical to those of the first embodiment.

Figure 16:
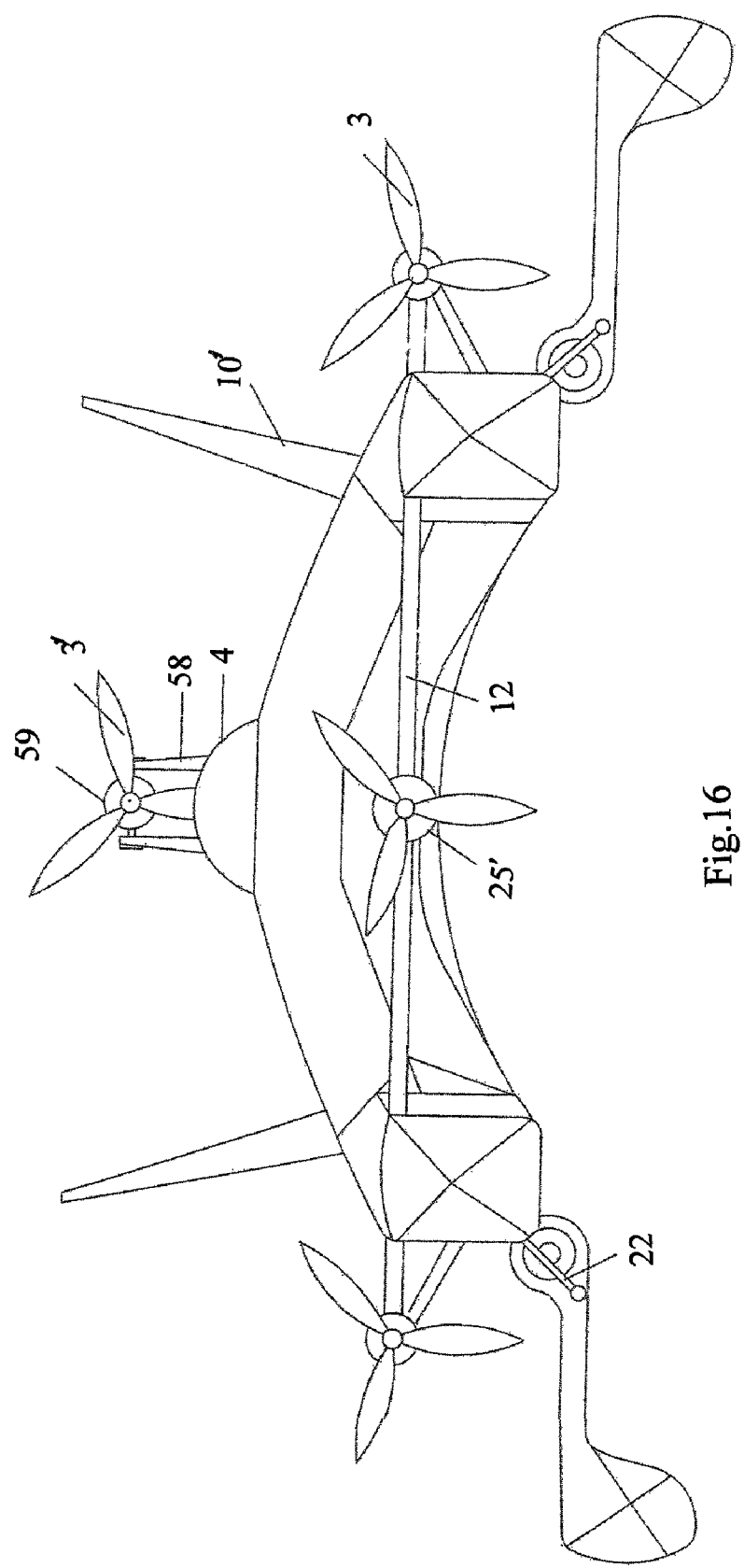
FIG. 16 is a front view of the flying wing boat in FIG. 15.
Figure 17:
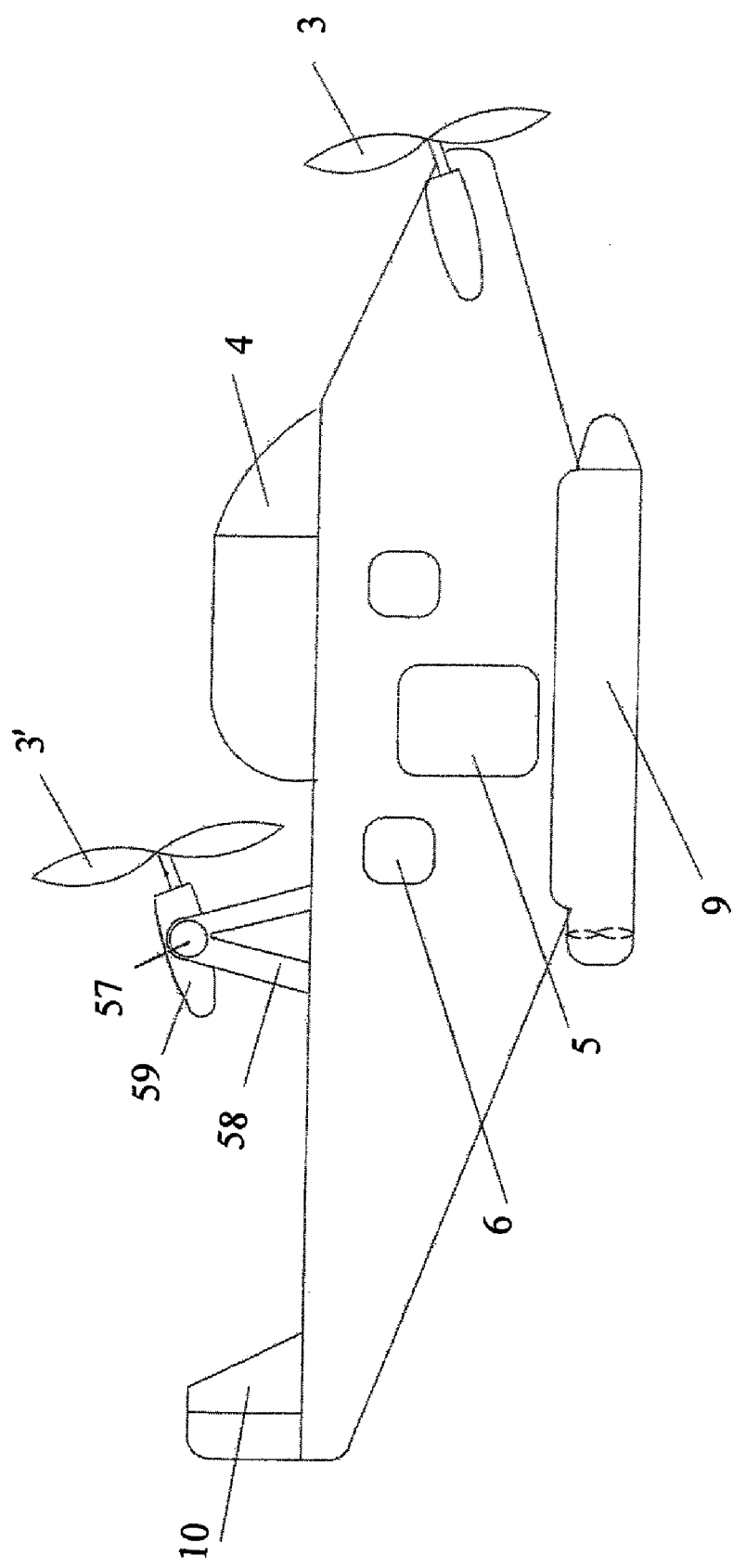
FIG. 17 is a side view of the flying wing boat in FIG. 16.
Figure 18:
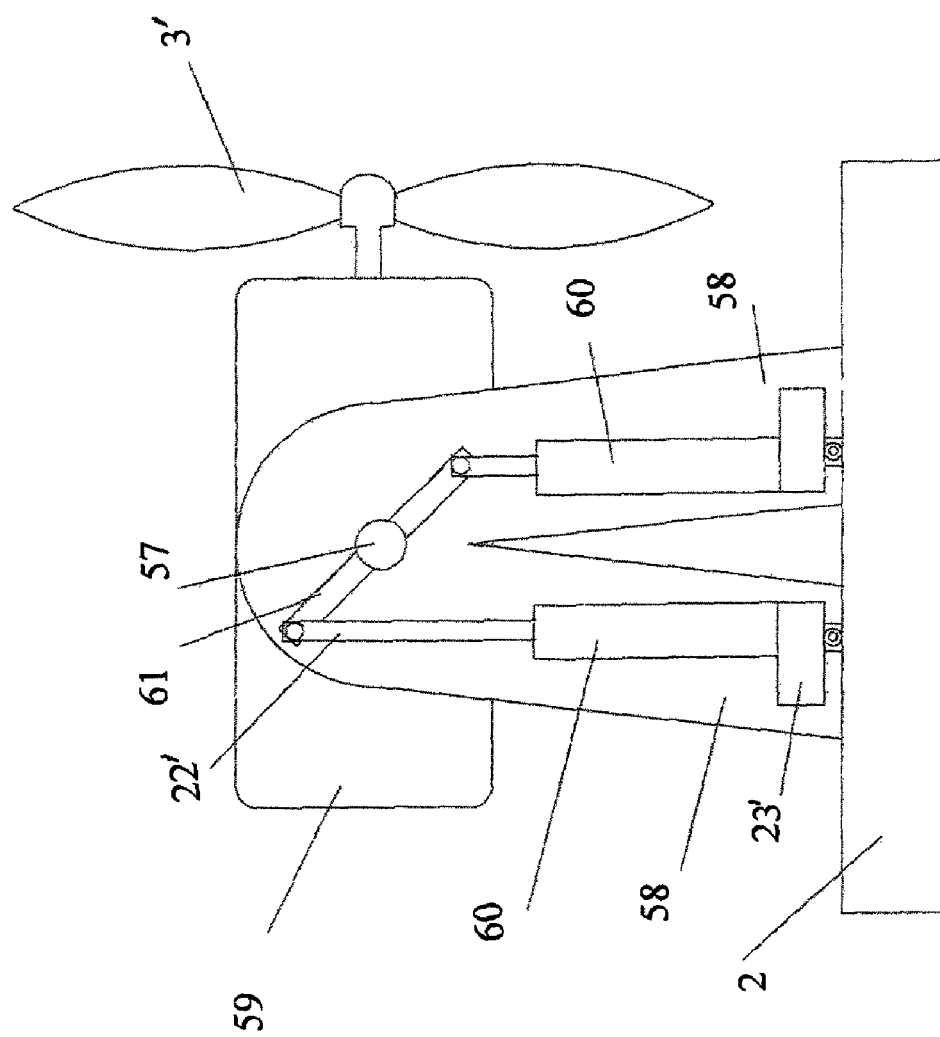
FIG. 18 is a schematic view of an actuating means of a motor according to the present invention.

FIGS. 15-20 illustrate a second embodiment of the flying wing boat of the present invention. As shown in FIG. 16, a pair of vertical tail wings 10' are provided at the aft part of the fuselage 2 and are inclined outwards with respect to the fuselages 2, while the horizontal tail wing is omitted in the second embodiment. Furthermore, the second embodiment of the flying wing boat includes a top propeller 3' mounted above of the fuselage 2 and three propellers 3 mounted at fore part of the fuselage 2. The flying wing boat of the second embodiment is also provided with a first main motor 59 over the fuselage 2 behind the cockpit 4. The first main motor 59 is connected to the top propeller 3'. Thus, the rotary wing in the first embodiment of the flying wing boat is omitted.

Next, the top propeller 3' and a first driving system supplying power thereto will be described with respect to FIG. 15-19. As shown in the figures, two brackets 58 are provided separately at the top of the fuselage 2 behind the cockpit 4. A supporting shaft 57 rotatably provided at the top of the brackets 58 and the first main motor 59 is fixedly mounted at the middle part of the supporting shaft 57. Thus, with the rotation of the supporting shaft 57, the first main motor 59 could pitch up and down with respect to the fuselage 2. To enable the pitch movement of the first main motor 59, an actuating means is provided. The actuating means comprises a lever 61 and two linear actuators 60, in which the lever 61 is fixed to the end of the supporting shaft 57, and each linear actuator 60 includes an actuating rod 22' and a main body 23', each main body 23' is pivotably mounted on the fuselage 2, and each actuating rod 22' is pivotably connected to one end of the lever 61. With the extension and retracing of the actuating rod 22' from and to the main body 23', the lever 61 could rotate the supporting shaft 57, and in turn make the first main motor 59 pitch up and down. However, two sets of the mentioned actuating means could be provided at both ends of the supporting shaft 57, or there could only provide a single lever and a single actuating means 60 at one end of the supporting shaft 57.

Figure 19:
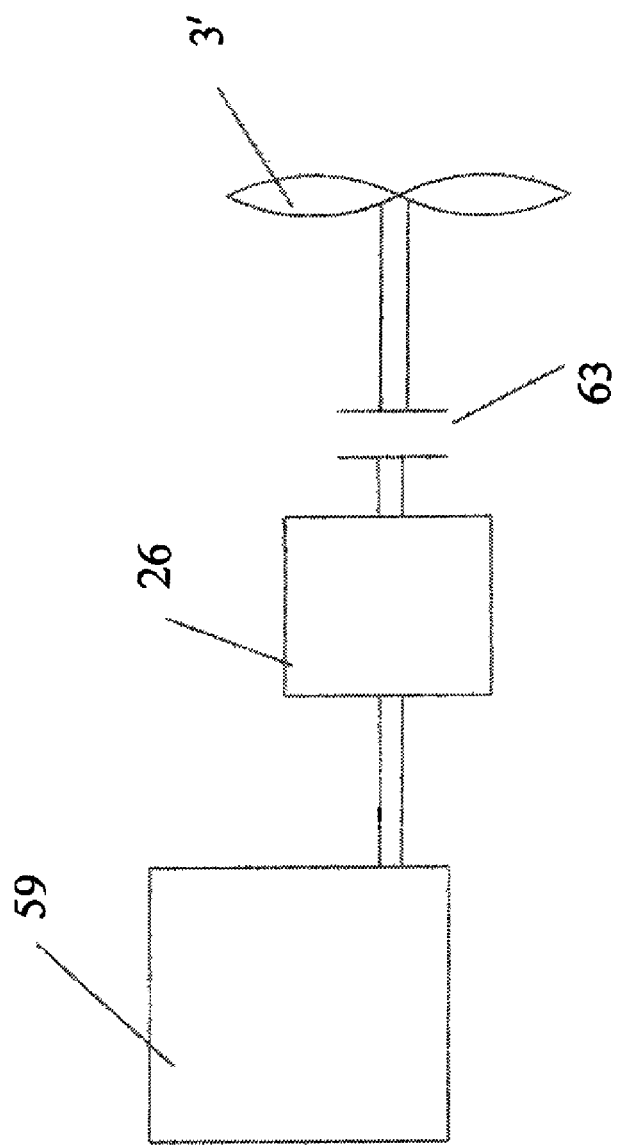
FIG. 19 is a schematic view of a first driving system of the second embodiment of the flying wing boat according to the present invention.

The first driving system of the top propeller 3' is illustrated in FIG. 19. The first driving system comprises the first main motor 59, a reducer 26' connected to the first main motor 59, a clutch 63 provided between the reducer 26' and the top propeller 3'. With the engagement of the clutch 63, the power output from the first main motor 59 is transmitted to fourth propeller 3' via the reducer 26' and the clutch 63. With the disengagement of the clutch 63, the power of the first main motor 59 will not be transmitted.

Figure 20:
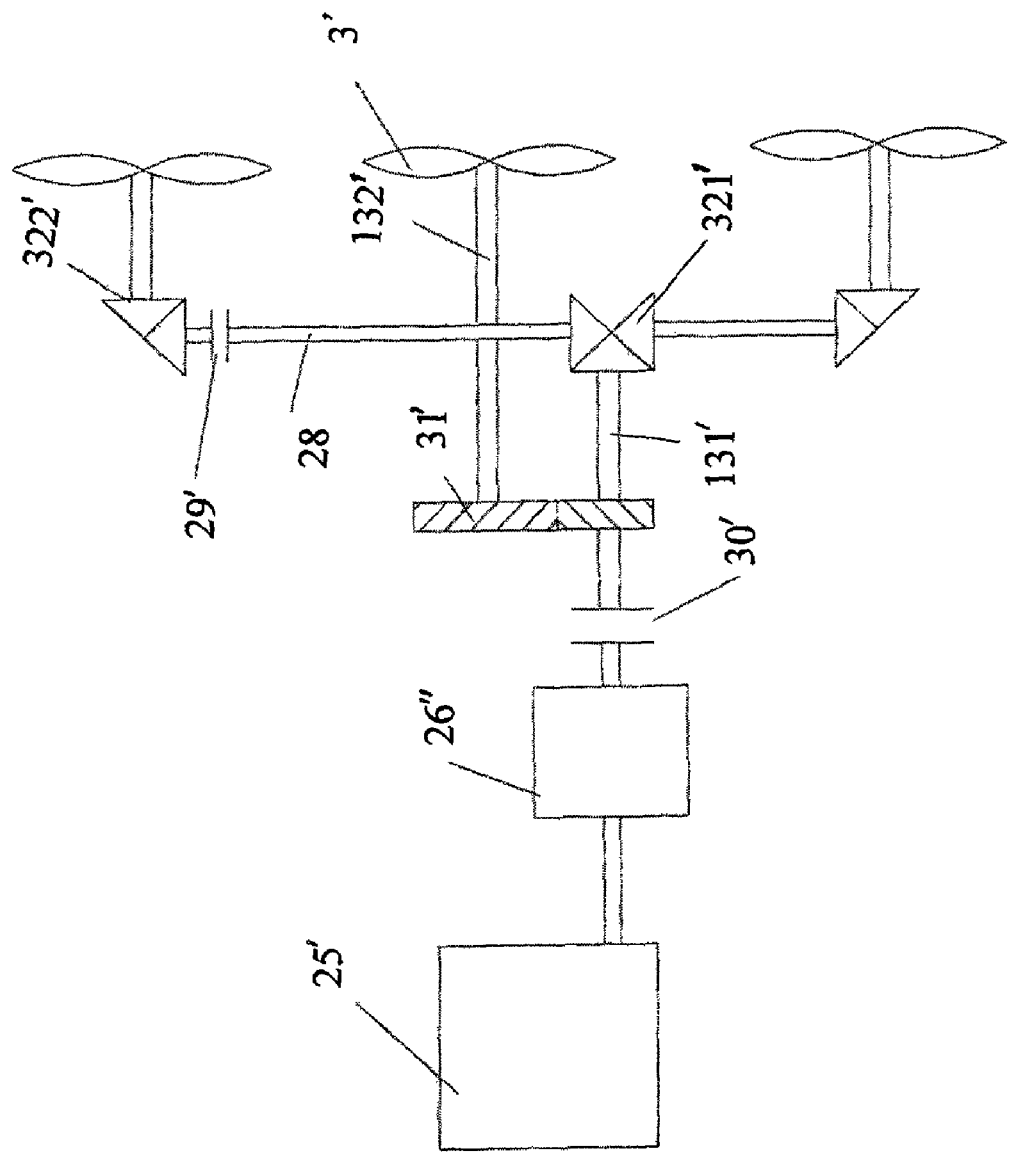
FIG. 20 is a schematic view of a second driving system of the second embodiment of the flying wing boat according to the present invention.

FIG. 20 illustrates a second driving system supplying power to the three propellers mounted at the fore part of the fuselage 2. The second driving system comprises a second main motor 25', a reducer 26" connected to the second main motor 25', a gear set 31' used to divide the power received from the second main motor 25' to the respective propellers 3, i.e. the left, right and middle propellers, a first clutch 30' provided between the reducer 26" and the gear set 31', a first input shaft 131' and a second input shaft 132' connected to the gear set 31', in which the second input shaft 132' is used to input the power to the middle propeller by connecting with the propeller directly, and the first input shaft 131' is used to input the power to the left and right propellers via several gear sets 321' and 322', such as sets of bevel gears, and connecting rods 133'. With the engagement of the first clutch 30', the power output from the second main motor 25' is transmitted to three propellers 3 via the reducer 26", the first clutch 30' and the gear set 31'. With the disengagement of the clutch 30', the power of the second main motor 25' will not be transmitted. In addition, a second clutch 29' could be provided in the power transmission path the right propeller (view from ahead of the fuselage). With the disengagement of the second clutch 29', the power output from the second main motor 25' will not be transmitted to the right propeller even it is transmitted to the other two propellers.

The second embodiment of the flying wing boat of the present invention operates in such a manner that, when the flying wing boat enters the main fairway, the second main motor 59 is turned on to rotate the top propeller 3' at a high speed. At the same time, the linear actuators 60 actuate the lever 61 resulting in the rotation of the supporting shaft 57. With the rotation of the supporting shaft 57, the first main motor 59 pitch upwards with respect to the fuselage 2. Then, the rotation of the top propeller 3' will generate a lift. After that, the second main motor 25' is turned on, and the first clutch 30' is engaged, while the second clutch 29' is disengaged, thus, the power output from the second main motor 25' is supplied to the middle and left propellers, but not to the right propeller. Therefore, the middle and left propellers will rotate while the right propeller will not rotate. Thus, a part of the push force generated by the middle and left propellers will compensate the torque to the fuselage 2 generated by the first main motor 59, while the other part will make the flying wing boat take off from the water surface and navigate in the planning mode at a high speed.

Although the description of the present invention is made with reference to the preferred embodiments, the present invention is not limited to these embodiments. Various modifications and changes can be made to the invention by those skilled in the art without departing from the spirit and scopes of the present invention.

What is claimed is:

1. A flying wing boat comprises:
    a fuselage provided with a cockpit at a bow thereof, wherein a lower surface of the fuselage is in an arch shape when viewed from front of the flying wing boat;
    a pair of main wings, each of which being pivotably connected to one side of said fuselage respectively and being provided with a flap;
    a pair of pontoons, each of which being provided at a tip of each of said main wings;
    at least one propeller provided at a fore part of said fuselage; and
    a driving system supplying power to said at least one propeller said pair of main wings are pivotable to vertical positions in which the said part of main wings are perpendicular to a horizontal plane of the flying wing boat.

2. The flying wing boat as claimed in claim 1 further comprising an actuating and locking means provided for each of said main wings, each of said actuating and locking means comprising:
    a pivot fixedly connected to said main wing and pivotably connected to the fuselage;
    a first actuator connected to the pivot for rotating said main wing; and
    a first brake connected to the pivot for locking said main wing.

3. The flying wing boat as claimed in claim 2 further comprising a plurality of linear actuators provided for each of said main wings, each of said linear actuators comprising:
    a main body pivotably mounted on the fuselage; and
    an actuating rod pivotably connected to a leading edge or a trailing edge of said main wing, and extendable from and retractable to said main body.

4. The flying wing boat as claimed in claim 1 further comprising a fluid conducting means provided at a middle part of each of said main wings, each of said fluid conducting means comprising:
    a gear wheel including an inner ring fixedly mounted on said main wing and an outer ring provided with a plurality of teeth on the outer surface thereof and rotatable with respect to said inner ring, in which a through hole is provided in said main wing to correspond to a through hole at the center of said inner ring;
    a second motor engaging with said gear wheel via a gear mounted on an output shaft thereof to rotate said gear wheel;
    a second brake engaging with said gear wheel to stop the rotation of said gear wheel;
    a middle shaft bridging said inner ring and revolvably mounted on said outer ring at both ends thereof along a diameter of said gear wheel;
    a third motor mounted on said outer ring and connecting to one of the ends of said middle shaft to make said middle shaft revolve about the longitudinal axis of itself;
    a third brake mounted on said outer ring and connecting to the other end of said middle shaft to stop the revelution of the middle shaft; and
    a conducting plate attached to the middle part of said middle shaft, in which the size of said conducting plate is identical to that of the through hole of said inner ring to be rotatable within the inner ring.

5. The flying wing boat as claimed in claim 1 further comprising a fluid conducting means provided at a middle part of each of said main wings, each of said fluid conducting means comprising:
    a gear wheel including an inner ring fixedly mounted on said main wing and an outer ring provided with a plurality of teeth on the outer surface thereof and rotatable with respect to said inner ring, in which a through hole is provided in said main wing to correspond to a through hole at the center of said inner ring;
    a middle shaft bridging said inner ring and revolvably mounted on said outer ring at both ends thereof along a diameter of said gear wheel;
    a plurality of planet gears supported on a plurality of gear shafts and engaged with said gear wheel;
    a worm gear wheel with inner teeth provided at the inner surface thereof and outer teeth provided at the outer surface thereof, in which said worn gear wheel is engaged with said planet gears by virtue of said inner teeth;

a second motor provided a worm at its output shaft, in which said worm is engaged with said outer teeth of said worm gear wheel;

a third motor mounted on said outer ring and connecting to one of the ends of said middle shaft to make said middle shaft revolve about the longitudinal axis of itself;

a third brake mounted on said outer ring and connecting to the other end of said middle shaft to stop the revelution of the middle shaft;

a conducting plate attached to the middle part of said middle shaft, in which the size of said conducting plate is identical to that of the through hole of said inner ring to be rotatable within the inner ring.

6. The flying wing boat as claimed in claim 1, wherein each of said pontoons comprises a rigid shell part and a ballonet part opposite to each other with respect to a wing beam of said main wing, in which said rigid shell part comprises a first outer shell made of rigid material and foam material filled within said first outer shell, and said ballonet part comprises a second outer shell made of elastic material and a plurality of gasbags provided within said second outer shell.

7. The flying wing boat as claimed in claim 6, wherein each of said gasbags includes an opening communicating with a gas transmission pipe via a charging valve and a discharging valve, in which said gas transmission pipe communicates with a gas charging pump mounted on said wing beam.

8. The flying wing boat as claimed in claim 6, wherein a thruster is provided at a back end of each of said pontoons.

9. The flying wing boat as claimed in claim 1 further comprising a rotary wing provided at a top part of said fuselage by virtue of a rotary shaft.

10. The flying wing boat as claimed in claim 9, wherein said driving system comprises:

a main motor mounted at the top part of said fuselage behind said cockpit;

a reducer connected to said main motor to receive the power output from said main motor;

a clutch device connected to said reducer, said clutch device including a first gear set for dividing and transmitting the power from said reducer to said rotary wing and said at least one propeller, a first clutch set in the power transmission path to said rotary wing and a second clutch set in the power transmission path to said at least one propeller;

an output shaft of said first clutch connected to said rotary shaft for supplying power to said rotary wing; and an output shaft of said second clutch connected to said at least one propeller for supplying power to said at least one propeller.

11. The flying wing boat as claimed in claim 1 further comprising two brackets provided separately at the top of said fuselage behind said cockpit, a supporting shaft rotatably provided at the top of said brackets, a first main motor fixedly mounted at the middle part of said supporting shaft, and a top propeller connected to said first main motor.

12. The flying wing boat as claimed in claim 11 further comprising at least one actuating means for rotating said supporting shaft, said actuating means comprising:

a lever to an end of said supporting shaft, at least one linear actuator, each of said linear actuator including an actuating rod pivotably connected to one end of said lever and a main body pivotably mounted on said fuselage, in which said actuating rod is extendable from and retractable to said main body.

13. The flying wing boat as claimed in claim 11, wherein said driving system comprises:

a second main motor;

a reducer connected to said second main motor to receive the power output from said second main motor;

a gear set for dividing the power received from said reducer to said at least one propeller; and a first clutch provided between said reducer and said gear set.

14. The flying wing boat as claimed in claim 13, wherein said driving system further comprises a second clutch set in the power transmission path to one of said at least one propeller.

15. The flying wing boat as claimed in claim 1 further comprising three or more wheels provided at a bottom of said fuselage.

16. The flying wing boat as claimed in claim 1 further comprising a tail wing, said tail wing comprising at least one vertical tail wing mounted on an aft part of said fuselage and a horizontal tail wing provided at the tip of said at least one vertical tail wing, in which a rudder is provided at a trailing edge of said at least one vertical tail wing, and a elevator is provided at a trailing edge of said horizontal tail wing.

17. The flying wing boat as claimed in claim 1 further comprising a pair of vertical tail wing mounted on an aft part of said fuselage and being inclined outwards with respect to said fuselage, in which a rudder is provided at a trailing edge of said at least one vertical tail wing.

18. The flying wing boat as claimed in claim 1 further comprising a horizontal front wing provided at said bow of said fuselage.

19. A flying wing boat comprises:

a fuselage provided with a cockpit at a bow thereof;

a pair of main wings, each of which being pivotably connected to one side of said fuselage respectively and being provided with a flap;

a pair of pontoons, each of which being provided at a tip of each of said main wings;

at least one propeller provided at a fore part of said fuselage; and a driving system supplying power to said at least one propeller, wherein each of said pontoons comprises a rigid shell part and a ballonet part opposite to each other with respect to a wing beam of said main wing, in which said rigid shell part comprises a first outer shell made of rigid material and foam material filled within said first outer shell, and said ballonet part comprises a second outer shell made of elastic material and a plurality of gasbags provided within said second outer shell.

20. A flying wing boat comprises:

a fuselage provided with a cockpit at a bow thereof;

a pair of main wings, each of which being pivotably connected to one side of said fuselage respectively and being provided with a flap;

a pair of pontoons, each of which being provided at a tip of each of said main wings;

at least one propeller provided at a fore part of said fuselage; and a driving system supplying power to said at least one propeller, wherein each of said pontoons comprises a rigid shell part and a ballonet part, and is adjustable in volume.

* * * * *